US010046680B2

(12) United States Patent
Cao et al.

(10) Patent No.: US 10,046,680 B2
(45) Date of Patent: Aug. 14, 2018

(54) FOUR-DIRECTION HEADREST

(71) Applicant: Yanfeng Adient Seating Co. Ltd., Shanghai (CN)

(72) Inventors: Yaowei Cao, Shanghai (CN); Biao Li, Shanghai (CN); Min Zhu, Shanghai (CN); Xia Li, Shanghai (CN); Donghai Xu, Shanghai (CN)

(73) Assignee: YANFENG ADIENT SEATING CO. LTD., Shanghai (CN)

( * ) Notice: Subject to any disclaimer, the term of this patent is extended or adjusted under 35 U.S.C. 154(b) by 0 days.

(21) Appl. No.: 15/316,012

(22) PCT Filed: Jun. 2, 2015

(86) PCT No.: PCT/CN2015/080563
§ 371 (c)(1),
(2) Date: Dec. 2, 2016

(87) PCT Pub. No.: WO2015/184970
PCT Pub. Date: Dec. 10, 2015

(65) Prior Publication Data
US 2017/0120786 A1 May 4, 2017

(30) Foreign Application Priority Data
Jun. 3, 2014 (CN) .......................... 2014 1 0243567

(51) Int. Cl.
*B60N 2/48* (2006.01)
(52) U.S. Cl.
CPC ......... *B60N 2/4814* (2013.01); *B60N 2/4864* (2013.01); *B60N 2002/4888* (2013.01)

(58) Field of Classification Search
CPC .............. B60N 2/4814; B60N 2/4864; B60N 2002/4888
(Continued)

(56) References Cited

U.S. PATENT DOCUMENTS 4,191,422 A * 3/1980 Inasawa .................. A47C 7/38
297/391
9,278,635 B2 * 3/2016 Humer ................. B60N 2/4864
(Continued)

FOREIGN PATENT DOCUMENTS

CN         201268246 Y      7/2009
CN         102700442 A     10/2012
(Continued)

OTHER PUBLICATIONS

International Search Report in connection with PCT International Application No. PCT/CN2015/080563.

*Primary Examiner* — Milton Nelson, Jr.
(74) *Attorney, Agent, or Firm* — John P. White; Cooper & Dunham LLP

(57) ABSTRACT

The invention discloses a novel four-direction headrest, which comprises a headrest housing, a U-shaped headrest bar, a Z-direction sliding fixing socket, an unlocking mechanism bracket, a tab, a tab return spring, an X-direction sliding fixing socket, an X-direction sliding guide, an unlocking steel wire, an unlocking button, wherein the locking and unlocking among the X-direction sliding fixing socket, the unlocking mechanism bracket, and the U-shaped headrest bar is realized by the unlocking steel wire, and the locking and unlocking between the tab and the X-direction sliding guide is realized by the tab movement driven by the unlocking steel wire. The locking and unlocking mechanism of the invention is simple, efficient and controllable.

12 Claims, 25 Drawing Sheets

(58) Field of Classification Search
USPC .......................................................... 297/410
See application file for complete search history.

(56) References Cited

U.S. PATENT DOCUMENTS

| | | | | |
|---|---|---|---|---|
| 2009/0058162 A1* | 3/2009 | Boes | .................... | B60N 2/4885 |
| | | | | 297/406 |
| 2014/0145489 A1* | 5/2014 | Wang | .................... | B60N 2/4864 |
| | | | | 297/410 |

FOREIGN PATENT DOCUMENTS

| | | |
|---|---|---|
| CN | 104002714 A | 8/2014 |
| KR | 101010896 B1 | 1/2011 |

* cited by examiner

FOUR-DIRECTION HEADREST

CROSS-REFERENCE TO RELATED APPLICATIONS

This application is a § 371 national stage of PCT International Application No. PCT/CN2015/080563, filed Jun. 2, 2015, claiming priority of Chinese Patent Application No. CN 201410243567.1, filed Jun. 3, 2014, the content of each of which is hereby incorporated by reference into the application.

TECHNICAL FIELD

The invention relates to seat technology, and more particularly to a novel four-direction headrest.

BACKGROUND ART

Currently, four direction or four-way (X and Z direction) headrests are mainly used in automotive front seats. As disclosed in the publication No. CN102700442, a car seat headrest with push-buttons capable of moving up and down and moving back and forth is complicated in unlocking way and the sliding form in the X-direction and Z-direction. A force compromise during the unlocking process is relatively severe, and the unlocking force is difficult to be controlled. Additionally, the prior four-way headrest housing is connected by use of the form of front and back or up and down clasping and screwing, so that the form of the clasp fitting results in poor strength, more assembly links, and lower reliability and efficiency. Moreover, the inserting bar of the prior four-way headrest is limited by the assembly and the fitting structure is also be limited to be open, thus, the way of slide fitting lacks diversity, and there is a problem of the fitting clearance. If the inserting bar of the headrest is divided into two inserting bars, a headrest twist problem occurs.

SUMMARY OF THE INVENTION

The technical problem to be solved by the invention is to provide a novel four-direction headrest which is simple in the way of unlocking and sliding in view of the deficiency of existing four-way headrests. The novel four-direction headrest can also improve the structures of the housing and inserting bar of the headrest.

The technical problem to be solved by the invention can be realized by the following technical scheme:

A novel four-direction headrest comprising:

A headrest housing having a button hole disposed at the lower part of one side wall of the headrest housing;

A U-shaped headrest bar having an upper portion at a crossbar end of the U-shaped headrest bar, the upper portion of the U-shaped headrest bar being inserted into the headrest housing from a bottom of the headrest housing, the U-shaped headrest bar provided with a plurality of locking notch grooves spaced apart on the two vertical supporting bars, the axes of the locking notch grooves being parallel to the crossbar of the U-shaped headrest;

A sliding sleeve disposed at a Z-direction sliding fixing socket on the two vertical supporting bars of the U-shaped headrest bar, the inner part of the Z-direction sliding fixing socket being hollow, and its axis being parallel to the crossbar of the U-shaped headrest and perpendicular to the forward and backward movement direction of the headrest, and comprising at least a first wall parallel to the crossbar of the U-shaped headrest bar, a tab projecting hole formed in the first wall;

An unlocking mechanism bracket installed in the hollow of the Z-direction sliding fixing socket, the unlocking mechanism bracket provided with an unlocking steel wire inserting groove and a tab inserting blind hole, wherein the unlocking steel wire inserting groove and the tab inserting blind hole are interpenetrating, the axes of which are perpendicular to each other, the axis of the unlocking steel wire inserting groove and the axis of the tab inserting blind hole are all perpendicular to the forward and backward movement direction of the headrest, and the axis of the unlocking steel wire inserting groove is parallel to the crossbar of the U-shaped headrest bar, the axis of the tab insertion blind hole is parallel to the vertical support bars of the U-shaped headrest bar and the opening thereof butts and connects to the tab projecting hole of the Z-direction sliding fixing socket;

A tab and a tab return spring slidably disposed in the tab insertion hole of the unlocking mechanism bracket, the tab comprising a tab tip projecting from an opening of the tab inserting blind hole and going through the tab projecting hole on the Z-direction sliding fixing socket, and the tab being provided with an unlocking notch groove, the unlocking notch groove corresponding to the unlocking steel wire inserting groove on the unlocking mechanism bracket, a groove bottom of the unlocking notch groove being an inclined wedge surface, one end of the tab return spring contacting the tab and the other end contacting a bottom surface of the tab inserting blind hole;

An X-direction sliding fixing socket fixed on the first wall of the Z-direction sliding fixing socket, the inner part of the Z-direction sliding fixing socket being hollow, the axis of the X-direction sliding fixing socket and the axis of the Z-direction sliding fixing socket being perpendicular to each other and parallel to the frontward and backward movement direction of the headrest; the X-direction sliding fixing socket being open on both ends parallel to the frontward and backward movement direction of the headrest and having a second wall connected to the first wall of the Z-direction sliding fixing socket, the second wall being parallel to the axis of the X-direction sliding fixing socket, and a tab inserting hole formed in the second wall, the tab inserting hole butting and connecting to the tab projecting hole of the Z-direction sliding fixing socket, and the tab tip inserting through the tab projecting hole of the Z-direction sliding fixing socket into the hollow of the Z-direction sliding fixing socket;

An X-direction sliding guide slidably inserted into the hollow of the X-direction sliding fixing socket, both ends of the X-direction sliding guide parallel to the forward and backward movement direction of the headrest respectively project through the openings on both ends of the X-direction sliding fixing socket parallel to the forward and backward movement direction of the headrest, wherein one end of the X-direction sliding guide parallel to the forward and backward movement direction of the headrest is securely connected with the headrest housing and comprises at least a first surface parallel to the second wall of the X-direction sliding fixing socket, a plurality of ratchet teeth disposed on the first surface, the ratchet teeth are engaged with the tab tip of the tab;

An unlocking steel wire slidably disposed in the unlocking steel wire inserting groove of the unlocking mechanism bracket, an intermediate position of the unlocking steel wire having a curved portion which is capable of acting on an inclined wedge surface in the tab, both ends of the unlocking steel wire being slidable in and out through the locking notch grooves of the two vertical support bars of the U-shaped headrest bar, respectively;

An unlocking button installed in the button hole on the headrest housing, the unlocking button acting on one end of the unlocking steel wire.

In a preferred embodiment of the invention, the Z-direction sliding fixing socket is made of a rectangular tube, the rectangular tube is open on both ends, and the top surface of the rectangular tube forms the first wall; an upper U-shaped headrest bar through hole is respectively formed at each end of the top surface of the rectangular tube, and a lower U-shaped headrest bar through hole is respectively formed at each end of the bottom surface of the rectangular tube, the upper and lower U-shaped headrest bar through holes at the same end of the rectangular tube are coaxial and are inserted therein with a Z-direction sliding sleeve, and a straight groove is formed in the sleeve wall of each of the Z-direction sliding sleeve so as to allow the unlocking steel wire to pass through and to be embedded into the locking notch groove in the two vertical supporting bars of the U-shaped headrest bar; the two vertical supporting bars of the U-shaped headrest bar are respectively passed through two Z-direction sliding sleeves.

In a preferred embodiment of the invention, the headrest housing is a plastic part and is prepared by a blow molding method or a hot-melt method.

In a preferred embodiment of the invention, the Z-direction sliding fixing socket is integrally formed with the X-direction sliding fixing socket.

In a preferred embodiment of the invention, the cross bar and the two vertical supporting bars of the U-shaped headrest bar are separately manufactured, and both ends of the cross bar are connected to the upper ends of the two supporting bars by riveting.

In a preferred embodiment of the invention, an unlocking steel wire return spring inserting hole is provided at each end of the groove bottom of the unlocking steel wire inserting groove of the unlocking mechanism bracket, and an unlocking steel wire return spring is disposed in each unlocking steel wire return spring inserting hole, and the outer end of the unlocking steel wire return spring acts on the unlocking steel wire.

In a preferred embodiment of the invention, a limiting guide boss is disposed on any inner groove wall of the unlocking steel wire inserting groove of the unlocking mechanism bracket, and the limiting guide boss limits and guides the curved portion of the unlocking steel wire.

In a preferred embodiment of the invention, the curved portion has a triangular configuration with a first hypotenuse and a second hypotenuse, wherein the first hypotenuse acts on the inclined wedge surface of the unlocking notch groove of the tab; there are two limiting guide bosses, located on the outsides of the first hypotenuse and the second hypotenuse respectively.

In a preferred embodiment of the invention, a cross bar portion perpendicular to the axis of the unlocking steel wire is disposed at one end of the unlocking steel wire, and the cross bar portion and the unlocking button interact with each other.

In a preferred embodiment of the invention, the unlocking button includes an unlocking button cover, a button return member and an unlocking button member, and the unlocking button cover has an inner hole; the button return member and the unlocking button member are assembled in the inner hole, and an inner end of the unlocking button member penetrates an inner hole bottom of the unlocking button cover and acts on a cross bar portion of the unlocking steel wire; the button return member is disposed in the inner hole of the unlocking button member, one end which is in contact with the inner hole top of the unlocking button member and the other end is in contact with the inner hole bottom of the unlocking button cover.

In a preferred embodiment of the invention, the Z-direction sliding fixing socket and the X-direction sliding fixing socket are made of a high-strength metal material.

In a preferred embodiment of the invention, the rear tooth surface of the ratchet teeth on the first surface of the X-direction sliding guide is a helical tooth surface, and the front tooth surface is a flat surface; the front tab surface of the tab tip is a inclined surface and the rear tab surface is a flat surface; and in the locked state, the front tooth surface of the ratchet teeth comes into contact with the rear tab surface of the tab tip to prevent the X-direction sliding guide from moving forward; the X-direction sliding guide is capable of moving backward after the X-direction sliding guide is subjected to a backward force transmitted from the headrest housing.

By adopting the above technical scheme, the invention has following advantages compared with the prior four-way headrests:

1. The use of a tab and an unlocking steel wire on the four-way headrest to lock and unlock on the X-direction and Z-direction makes the locking and unlocking mechanism simple, efficient and controllable;

2. The Z-direction sliding fixing socket and the X-direction sliding fixing socket are made of high-strength metal materials, and made into integral or detachable forms to ensure the headrest more secure and reliable in the crash process. Metal material bracket avoids the concern about the strength is not enough due to the simple and compact structure, the overall mechanism can be made simple, compact and lightweight to achieve the purpose of saving material and cost;

3. The headrest housing of the invention is plastic part and is prepared by a blow molding method or a hot-melt method, solving the defects of poor strength, more assembly links, and reliability and efficiency to be not high resulted from the form of front and back or up and down clasping and screwing to connect used by the prior four-way headrest housing, eliminating the security experiment risk for the form of clasping and screwing connection, improving the efficiency of the assembly, and the blow molding process makes the housing to be more integral strong and more secure; and 4. The headrest bar of the invention is riveted by using a cross bar and two supporting bars on the left and right to be riveted into an integral part, and the anti-strike strength can be increased while realizing the anti-twist, and the fitting sliding structure can be diverse.

DETAILED DESCRIPTION OF PREFERRED EMBODIMENTS

The invention will now be further described in conjunction with the accompanying drawings and preferred embodiments.

Figure 1:
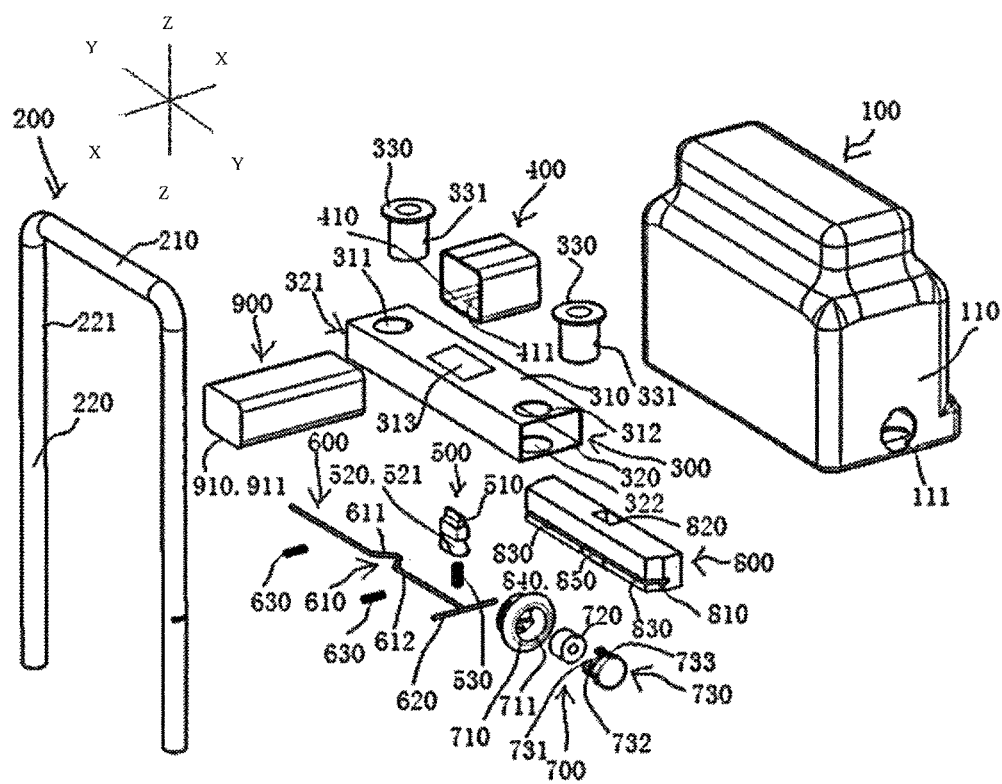
FIG. 1 is a schematic exploded view of all the components of the novel four-direction headrest of the invention.
Figure 2:
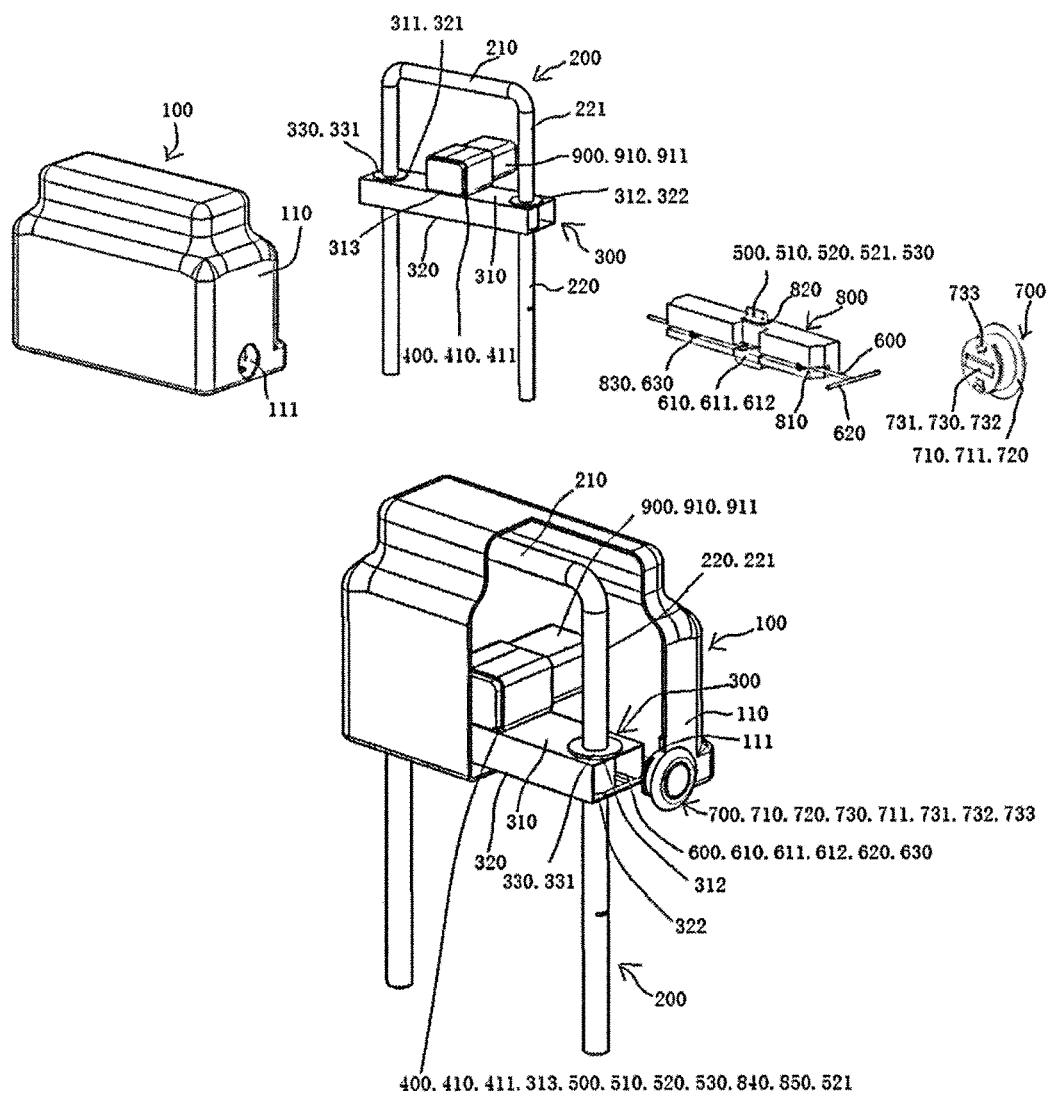
FIG. 2 is a schematic exploded view of the novel four-direction headrest assembly of the invention.

Referring to FIG. 1 and FIG. 2, a novel four-direction headrest comprises a headrest housing 100, a U-shaped headrest bar 200, a Z-direction sliding fixing socket 300, an X-direction sliding fixing socket (sleeve seat) 400, a tab 500, an unlocking steel wire 600, an unlocking button 700, an unlocking mechanism bracket 800, an X-direction sliding guide 900, and the like.

The headrest housing 100 is a plastic part and is prepared by a blow molding method or a hot-melt method. The bottom of the headrest housing 100 is open to facilitate or accommodate the U-shaped headrest bar 200, the Z-direction sliding fixing socket 300, the X-direction sliding fixing socket 400, the tab 500, the unlocking steel wire 600, then unlocking button 700, the unlocking mechanism bracket 800, the X-direction sliding guide 900 and the like to be fitted into the headrest housing 100. Further, a button hole 111 is provided in the lower portion of a side wall 110 of the headrest housing 100 to facilitate the installation of the unlocking button 700.

Figure 9:
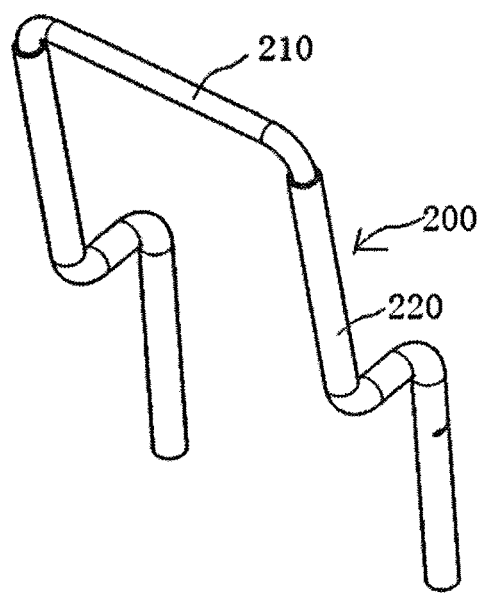
FIG. 9 is a schematic view of the structure of another U-shaped headrest bar of the novel four-direction headrest of the invention.
Figure 10:
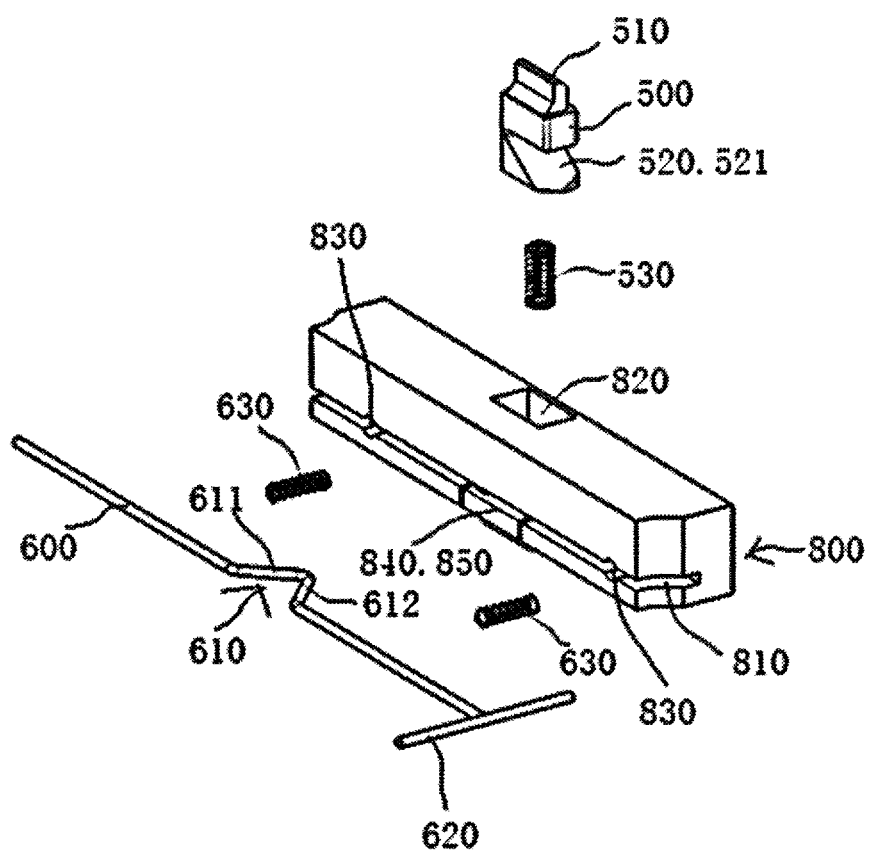
FIG. 10 is a schematic exploded view of the assembly of the unlocking mechanism bracket, the unlocking steel wire and the tab of the novel four-direction headrest of the invention.
Figure 11:
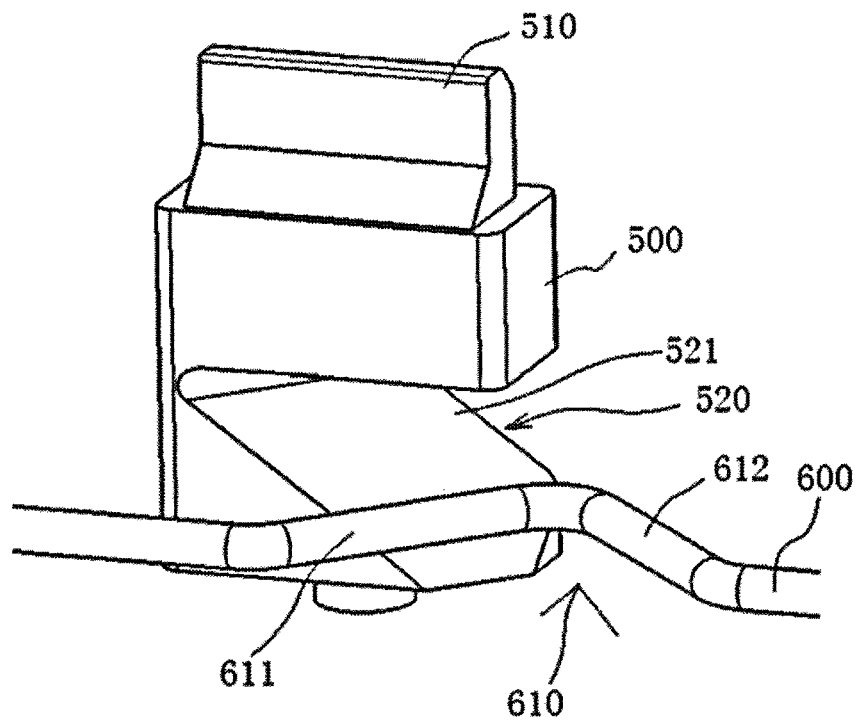
FIG. 11 is a schematic view of the interaction of the inclined wedge surface of the tab with the curved portion in the unlocking steel wire of the novel four-direction headrest of the invention.

The U-shaped headrest bar 200 may be of unitary construction, as shown in FIG. 1, with a cross bar 210 and two vertical supporting bars 220, which are integrally manufactured. A plurality of locking notch grooves 221 are separately formed on the two vertical supporting bars 220 and the axes of the locking notch grooves 221 are parallel to the axis of the cross bar 210 of the U-shaped headrest bar 200. The cross bar 210 and the two vertical supporting bars 220 of the U-shaped headrest bar 200 may certainly also be manufactured separately, and then both ends of the cross bar 210 and the upper ends of the two vertical supporting bars 220 are joined together by riveting (see FIG. 9).

The Z-direction sliding fixing socket 300 is made of a high-strength metal material such as a high-strength sheet, an aluminum sheet, or the like, or may be made of a rectangular metal tube. The rectangular tube is open on both ends, and an upper U-shaped headrest bar through hole 311, 312 is respectively formed at each of two ends of the top surface 310 of the rectangular tube, a lower U-shaped headrest bar through hole 321, 322 is respectively formed at each of two ends of the bottom surface 320 of the rectangular tube, the upper and lower U-shaped headrest bar through holes 311, 321 at the left end of the rectangular tube are coaxial, and the upper and lower U-shaped headrest bar through holes 312, 322 at the right end of the rectangular tube are coaxial. A tab projecting hole 313 is formed in the middle of the top surface 310, and the tab projecting hole 313 is a square hole.

A straight groove 331 is formed in the sleeve walls of the two Z-direction sliding sleeves 330.

The X-direction sliding fixing socket 400 is made of a high-strength metal material such as a high-strength sheet, an aluminum sheet, or the like, or may be made of a rectangular metal tube. The rectangular tube is open on both ends, and a tab inserting hole 411 is formed in the bottom surface 410 of the rectangular tube, the tab inserting hole 411 is a square hole, and its shape and size are matched with the tab projecting hole 313.

Figure 3:
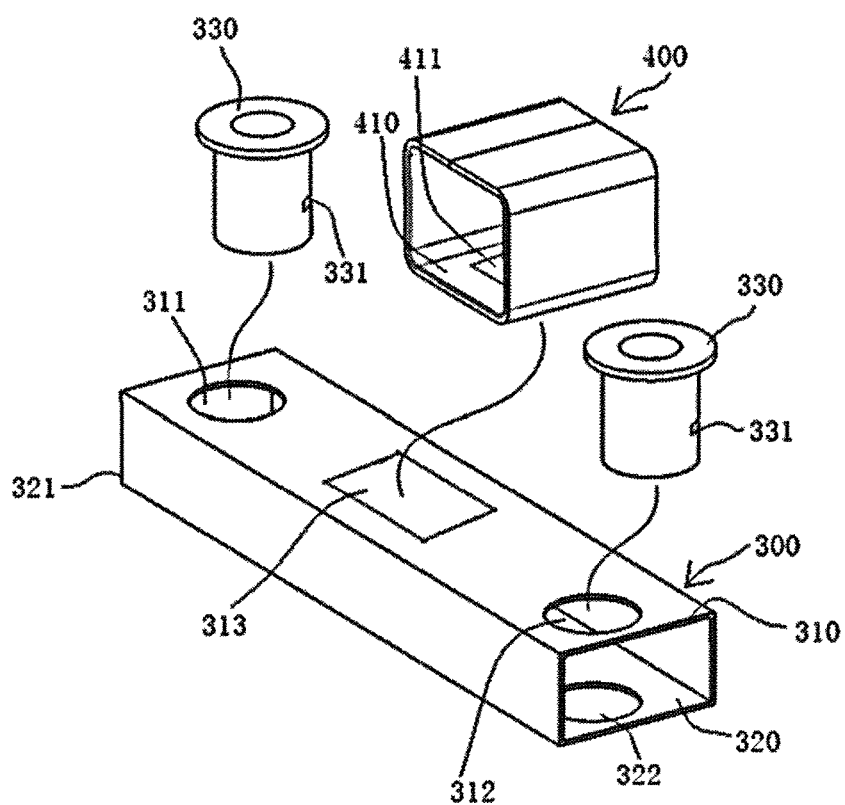
FIG. 3 is a schematic exploded view of the assembly of the Z-direction sliding fixing socket, the X-direction sliding fixing socket and the Z-direction sliding sleeve of the novel four-direction headrest of the invention.
Figure 4:
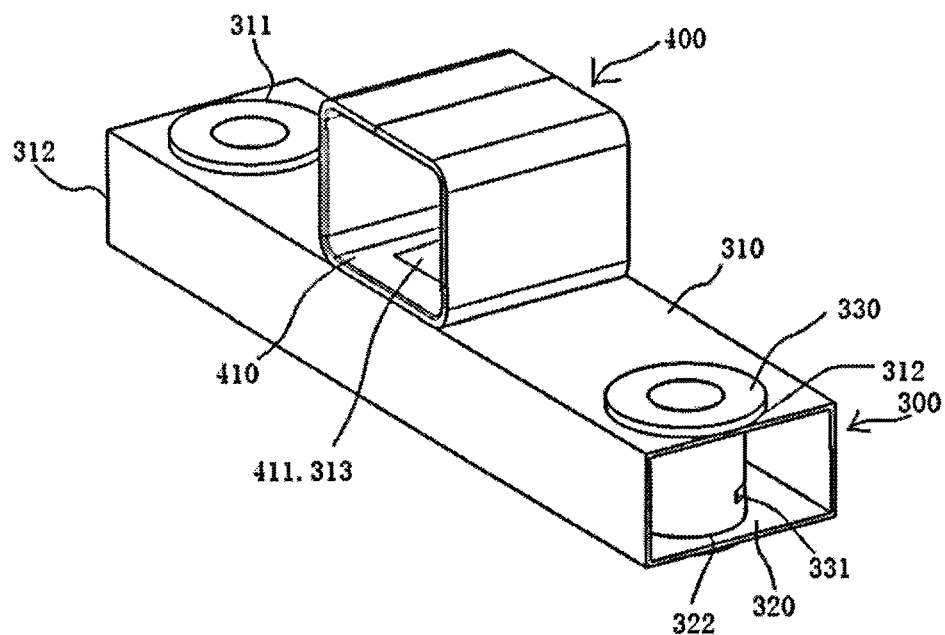
FIG. 4 is a schematic view of the assembly of the Z-direction sliding fixing socket, the X-direction sliding fixing socket and the Z-direction sliding sleeve of the novel four-direction headrest of the invention.
Figure 5:
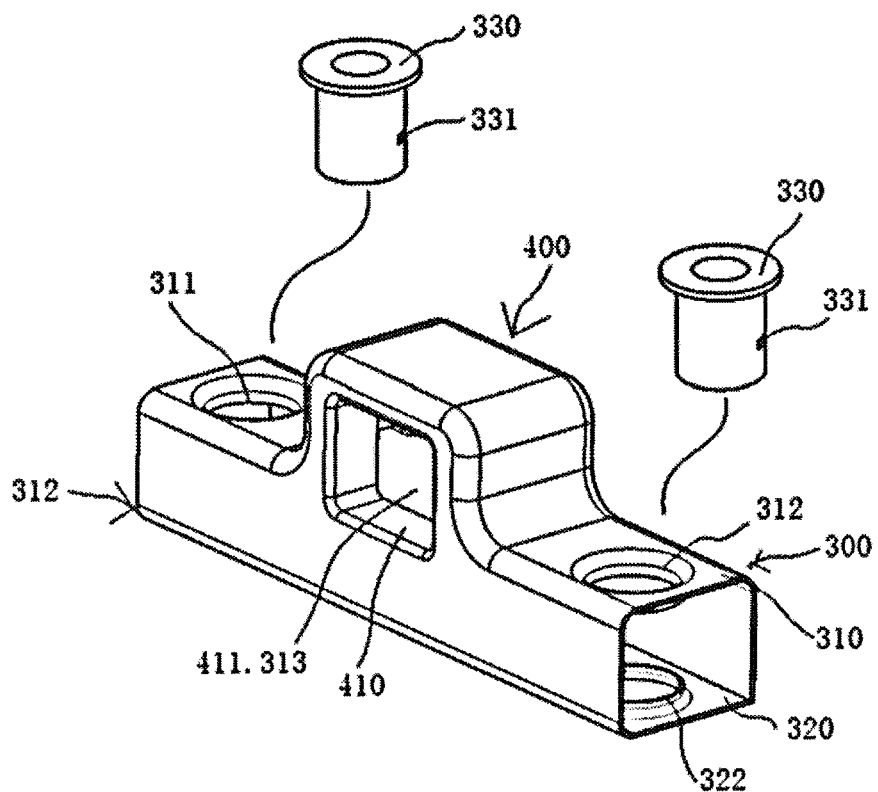
FIG. 5 is a schematic exploded view of the integration of the Z-direction sliding fixing socket and the X-direction sliding fixing socket and the assembly with the Z-direction sliding sleeve of the novel four-direction headrest of the invention.
Figure 6:
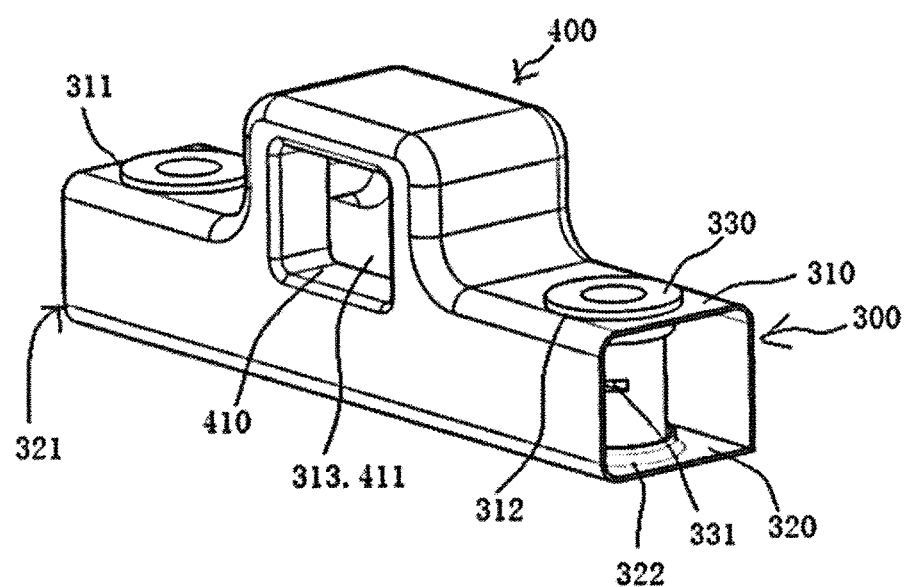
FIG. 6 is a schematic view of the integration of the Z-direction sliding fixing socket and the X-direction sliding fixing socket and the assembly with the Z-direction sliding sleeve of the novel four-direction headrest of the invention.

The Z-direction sliding fixing socket 300 and the X-direction sliding fixing socket 400 may separately be manufactured and then soldered or welded together (as shown in FIG. 3 and FIG. 4), or may be integrally manufactured (as shown in FIG. 5 and FIG. 6).

If the Z-direction sliding fixing socket 300 and the X-direction sliding fixing socket 400 are separately manufactured as shown in FIG. 3 and FIG. 4, it is necessary to solder the Z-direction sliding fixing socket 300 and the X-direction sliding fixing socket 400 together. While the solidering is done, the bottom surface 410 of the X-direction sliding fixing socket 400 is first stacked on the top surface 310 of the Z-direction sliding fixing socket 300, and the tab inserting hole 411 on the bottom surface 410 of the X-direction sliding fixing socket 400 is aligned with the tab projecting hole 313 on the top surface 310 of the Z-direction sliding fixing socket 300 while the axis of the X-direction sliding fixing socket 400 and the axis of the Z-direction sliding fixing socket 300 are perpendicular to each other, then the soldering is performed, and a X-direction and Z-direction adjustment bracket is formed after the soldering.

Referring to FIGS. 10 to 15 in conjunction, the unlocking mechanism bracket 800 is generally a cuboid, on which an unlocking steel wire inserting groove 810 and a tab inserting blind hole 820 are provided, and the unlocking steel wire inserting groove 810 and the tab inserting blind hole 820 are interpenetrating, the axes of which are perpendicular to each other. Unlocking steel wire return spring inserting hole 830 is provided at each end of the groove bottom of the unlocking steel wire inserting groove 810, and the axis of the unlocking steel wire return spring inserting hole 830 and the axis of the unlocking steel wire inserting groove 810 are perpendicular to each other. Two limiting guide boss 840, 850 are disposed on the inner lower groove wall of the unlocking steel wire inserting groove 810 of the unlocking mechanism bracket 800.

The top portion of the tab 500 has a tab tip 510, its lower portion has an unlocking notch groove 520, and the groove bottom surface of the unlocking notch groove 520 is an inclined wedge surface 521 having an extended surface intersecting an extension line of the axis of the tab 510.

The middle portion of the unlocking steel wire 600 is folded into a triangular shape 610 with two hypotenuses 611, 612, and one end contacting the unlocking button 700 has a cross bar portion 620.

Referring to FIGS. 16 to 20 in conjunction, the unlocking button 700 includes an unlocking button cover 710, a button return member 720 and an unlocking button member 730. The button return member 720 may be a spring or an elastic body. The unlocking button cover 710 has an inner hole 711, the button return member 720 and the unlocking button member 730 are assembled in the inner hole 711 of the unlocking button cover 710, and an inner end 731 of the unlocking button member 730 penetrates the bottom of the inner hole 711 of the unlocking button cover 710. The button return member 720 is disposed in the inner hole 732 of the unlocking button member 730, one end thereof is in contact with the top of the inner hole 732 of the unlocking button member 730, and the other end is in contact with the bottom of the inner hole 711 of the unlocking button cover 710. The two pawls 733 of the unlocking button member 730 penetrate the bottom of the inner hole 711 of the unlocking button cover 710 so as to hook on the bottom surface of the unlocking button cover 710.

The X-direction sliding guide 900 is also generally a cuboid, and a plurality of ratchet teeth 911 are disposed on the bottom surface 910 thereof.

The assembly method of the four-way headrest is as follows:

Step 1: fit the tab 500 into the tab inserting blind hole 820 of the unlocking mechanism bracket 800 along with the tab return spring 530 in a manner that the tab tip 510 is directed upward. The upper end of the tab return spring 530 contacts the bottom surface of the tab 500, and the lower end of the tab return spring 530 contacts the bottom surface of the tab inserting blind hole 820 (see FIG. 10 to FIG. 15 in conjunction);

Step 2: place two unlocking steel wire return springs 630 into the two unlocking steel wire return spring inserting holes 830 in the groove bottom of the unlocking steel wire inserting groove 810 of the unlocking mechanism bracket 800, and then insert the unlocking steel wire 600 into the unlocking steel wire inserting groove 810 of the unlocking mechanism bracket 800, and insert the triangle 610 in the middle of the unlocking steel wire 600 into the unlocking notch groove 520 of the tab 500 to contact the inclined wedge surface 521 of the unlocking notch groove 520; in the mean time, place the hypotenuse 611 of the triangular 610 of the unlocking steel wire 600 at the inner side of the limiting guide boss 840 in the unlocking steel wire inserting groove 810, and place the hypotenuse 612 of the triangular 610 of the unlocking steel wire 600 into the limiting guide boss 850 in the unlocking steel wire inserting groove 810. The unlocking steel wire 600 is restricted from exiting the unlocking steel wire inserting groove 810 by means of restricting the hypotenuses 611, 612 of the triangle 610 by limiting guide bosses 840, 850 (see FIG. 10 to FIG. 15 in conjunction);

Step 3: insert the unlocking mechanism bracket 800 with the assembly of the tab 500 and the unlocking steel wire 600 into the Z-direction sliding fixing socket 300 from the opening at one end of the Z-direction sliding fixing socket 300, and adjust the position of the unlocking mechanism bracket 800 so as to insert the tab tip 510 of the tab 500 into the X-direction sliding fixing socket 400 through the tab projecting hole 313 on the top surface 310 of the Z-direction sliding fixing socket 300 and the tab inserting hole 411 on the bottom surface 410 of the X-direction sliding fixing socket 400;

Step 4: insert two Z-direction sliding sleeves 330 into the upper and lower U-shaped headrest bar through holes 311, 321 on the left end of the Z-direction sliding fixing socket 300 and the upper and lower U-shaped headrest bar through holes 312, 322 on the right end of the Z-direction sliding fixing socket 300, respectively;

Step 5: insert two vertical supporting bars 220 of the U-shaped headrest bar 200 through the two Z-direction sliding sleeves 330 from the top to the bottom, and align the straight grooves 331 on the two Z-direction sliding sleeves 330 with one of locking notch grooves 221 on the vertical supporting bars 220; and insert the unlocking steel wire 600 into the locking notch groove 221 on the vertical supporting bars 220 through the straight grooves 331 on the two Z-direction sliding sleeves 330 and the unlocking steel wire 600 is able to slide in and out;

Step 6: insert the X-direction sliding guide 900 into the X-direction sliding fixing socket 400 from the opening at one end of the X-direction sliding fixing socket 400, and engage a ratchet teeth 911 on the bottom surface 910 of the X-direction sliding guide 900 with the tab tip 510, so that both ends of the X-direction sliding guide 900 respectively project through the openings at both ends of the X-direction sliding fixing socket 400;

Step 7: insert the top end of the U-shaped headrest bar 200 to which the Z-direction sliding fixing socket 300, the X-direction sliding fixing socket 400, the tab 500, the unlocking steel wire 600, the unlocking mechanism bracket 800 and the X-direction sliding guide 900 are assembled into the headrest housing 100 from the bottom of the headrest housing 100, fixedly connect one end of the X-direction sliding guide 900 to the headrest housing 100, and oppose the cross bar portion 620 of one end of the unlocking steel wire 600 to the button hole 111 in the lower portion of the side wall 110 of the headrest housing 100;

Step 8: install the unlocking button 700 into the button hole 111 and bring the inner end 731 in the unlocking button 700 into contact with the cross bar portion 620.

After the entire four-way headrest is assembled, the axis of the Z-direction sliding fixing socket 300 is parallel to the cross bar 210 of the U-shaped headrest bar 200, perpendicular to the forward and backward movement direction of the headrest, and the axis of the unlocking steel wire inserting groove 810 and the axis of the tab inserting blind hole 820 are both perpendicular to the forward and backward movement direction of the headrest, while the axis of the unlocking steel wire inserting groove 810 is parallel to the cross bar 210 of the U-shaped headrest bar 200, the axis of the tab inserting blind hole 820 is parallel to the vertical supporting bar 220 of the U-shaped headrest bar 200; the axis of the X-direction sliding fixing socket 400 is parallel to the forward and backward movement direction of the headrest; the X-direction sliding guide 900 is parallel to the forward and backward movement direction of the headrest.

Referring to FIGS. 7, 8, 14, 15 and 35 in conjunction, when the unlocking steel wire 600 is moved a distance along the axial direction thereof by the thrust F of the unlocking button (not shown), since the hypotenuse 611 of the triangular 610 on the unlocking steel wire 600 is counteracted by the inclined wedge surface 521 of the unlocking notch groove 520 in the tab 500, after overcoming the spring force of the two unlocking steel wire return springs 630, the unlocking steel wire 600 at the mean time is moved towards the deep of the unlocking steel wire inserting groove 810 of the unlocking mechanism bracket 800 so that the unlocking steel wire 600 slides out of the locking notch groove 221 on the vertical supporting bar 220 of the U-shaped headrest bar 200 and into the straight groove 331 of the Z-direction sliding sleeve 330, thus the unlocking between the unlocking mechanism bracket 800 and the U-shaped headrest bar 200 is achieved, in which case the two unlocking steel wire return springs 630 are compressed and accumulate energy. The hypotenuse 611 of the triangle 610 on the unlocking steel wire 600 will move from lower to higher position along the inclined wedge surface 521 of the unlocking notch groove 520 in the tab 500 so that the tab 500 is moved downward by means of the inclined wedge surface 521 after overcoming the spring force of the tab return spring 530. The tab tip 510 of the tab 500 is disengaged from the ratchet teeth 911 of the bottom surface 910 of the X-direction sliding guide 900 so that the unlocking between the X-direction sliding guide 900 and the Z-direction sliding fixing socket 300 is achieved, in which case the tab return spring 530 is compressed and accumulates energy.

Figure 7:
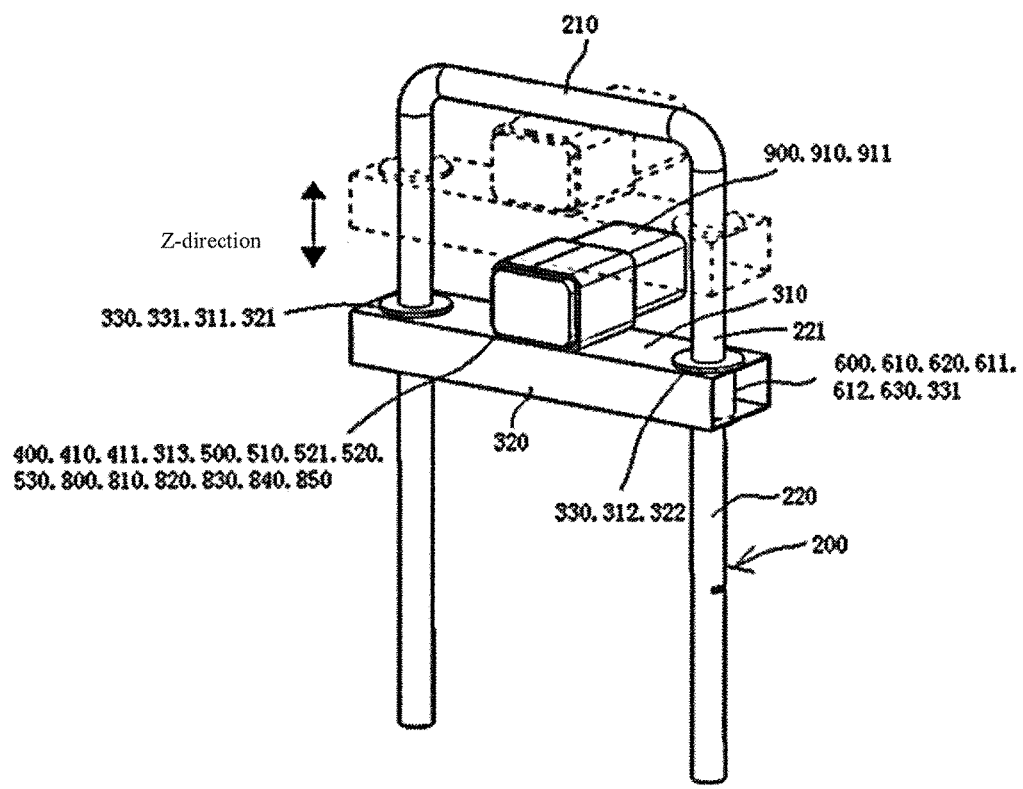
FIG. 7 is a schematic view of the sliding movement of the Z-direction sliding fixing socket on the U-shaped headrest bar of the novel four-direction headrest of the invention.
Figure 12:
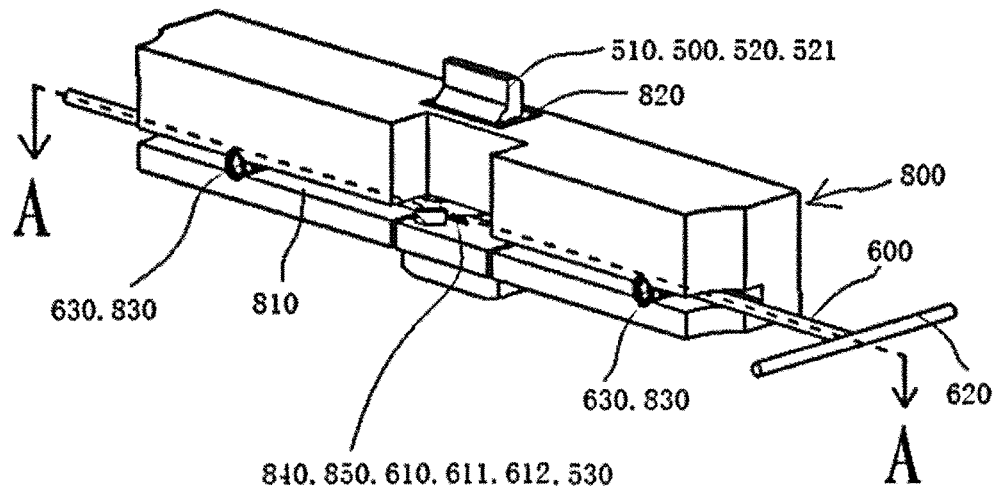
FIG. 12 is a schematic view of the assembly of the unlocking mechanism bracket, the unlocking steel wire and the tab and being in the locked state of the novel four-direction headrest of the invention.
Figure 13:
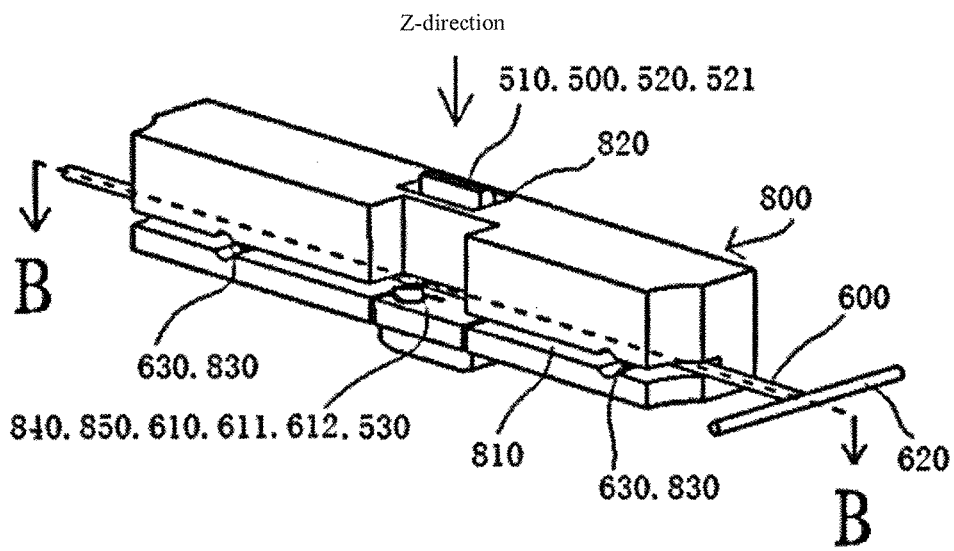
FIG. 13 is a cross-sectional view taken along line A-A of FIG. 12.
Figure 14:
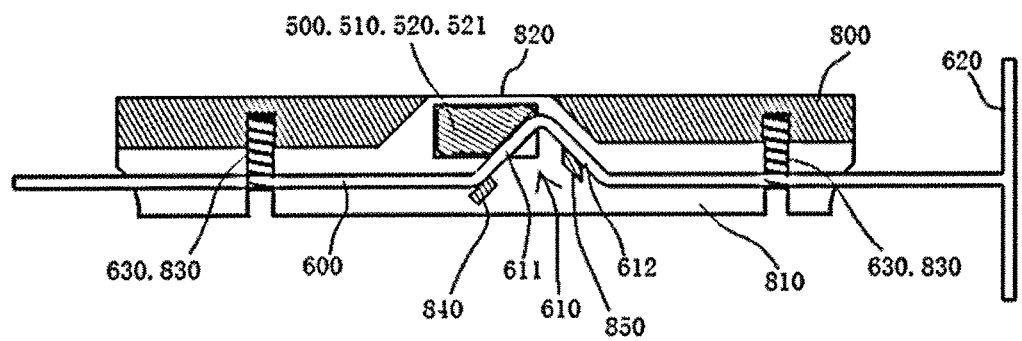
FIG. 14 is a schematic view of the assembly of the unlocking mechanism bracket, the unlocking steel wire and the tab and being in the unlocked state of the novel four-direction headrest of the invention.
Figure 15:
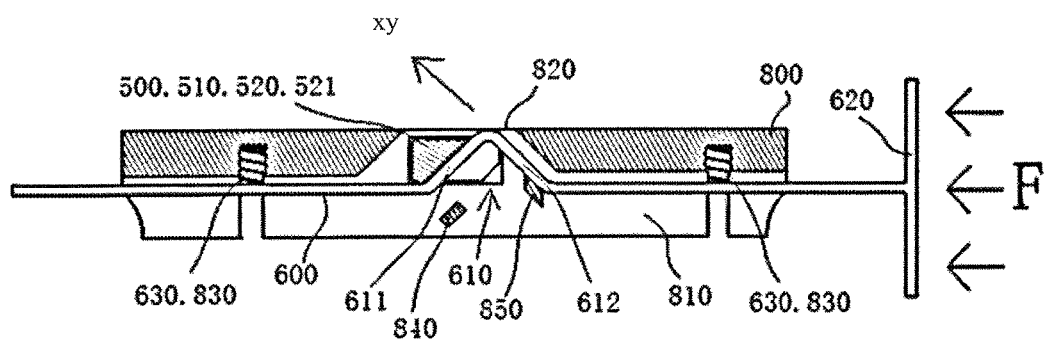
FIG. 15 is a cross-sectional view taken along the line B-B of FIG. 14.
Figure 16:
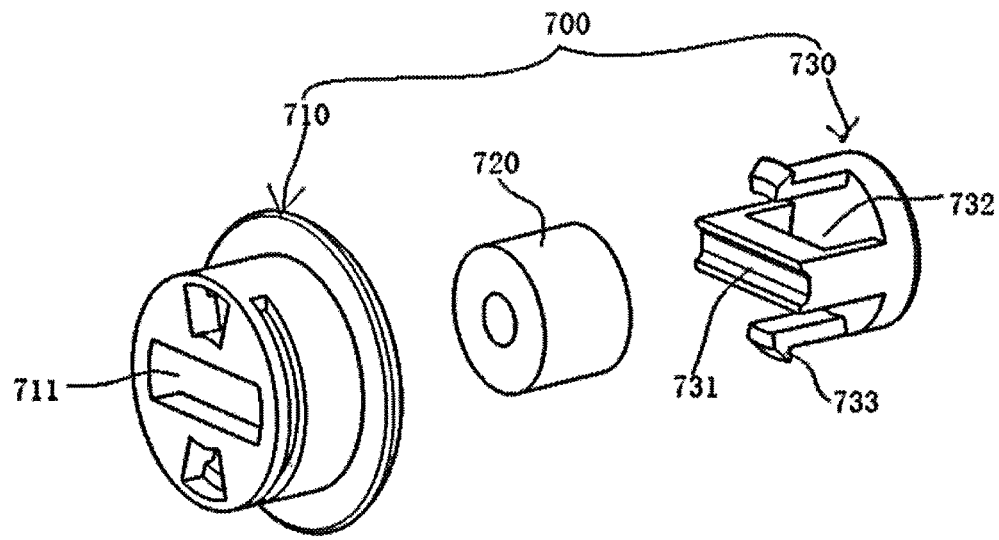
FIG. 16 is a schematic exploded view of the structure of the unlocking button of the novel four-direction headrest of the invention.
Figure 17:
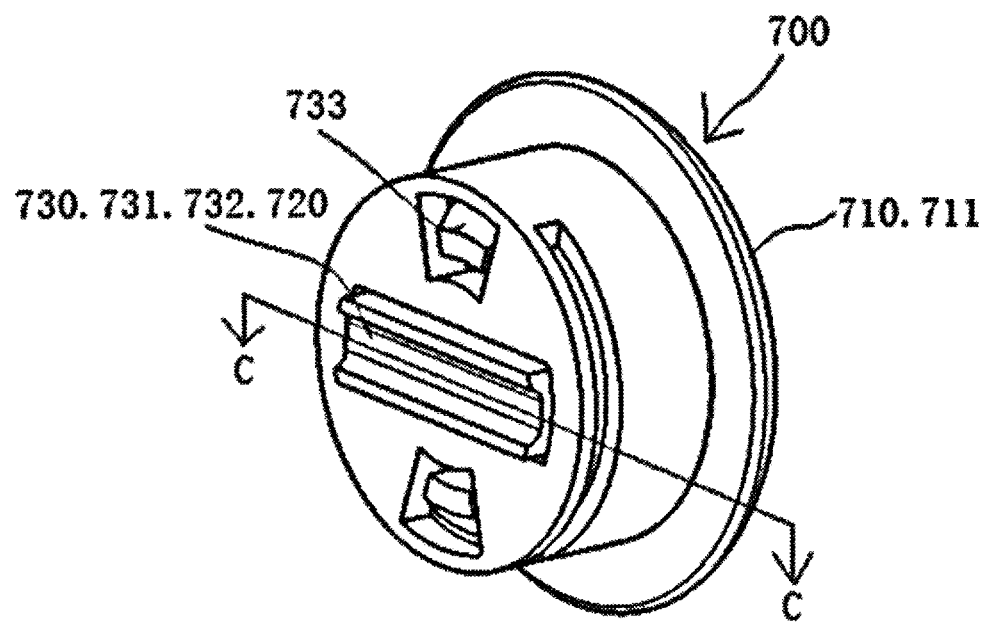
FIG. 17 is a schematic view of the assembly of the unlocking button and being in the locked state of the novel four-direction headrest of the invention.
Figure 18:
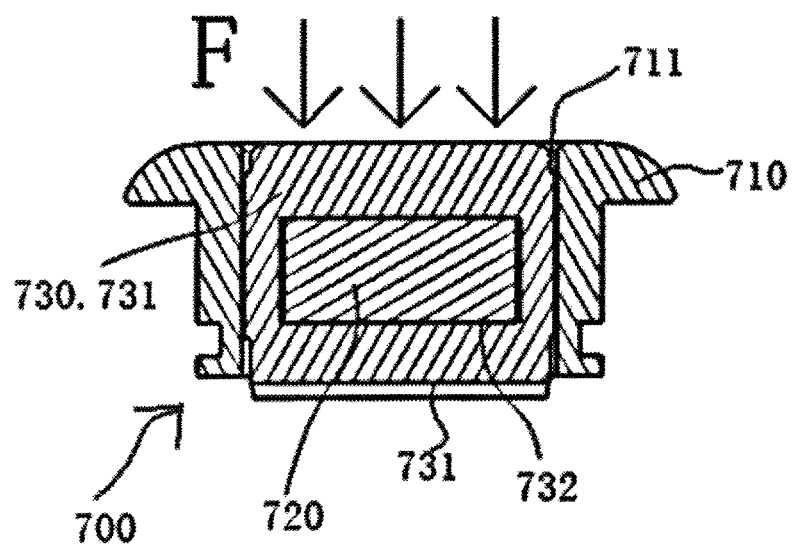
FIG. 18 is a cross-sectional view taken along the line C-C of FIG. 17.
Figure 19:
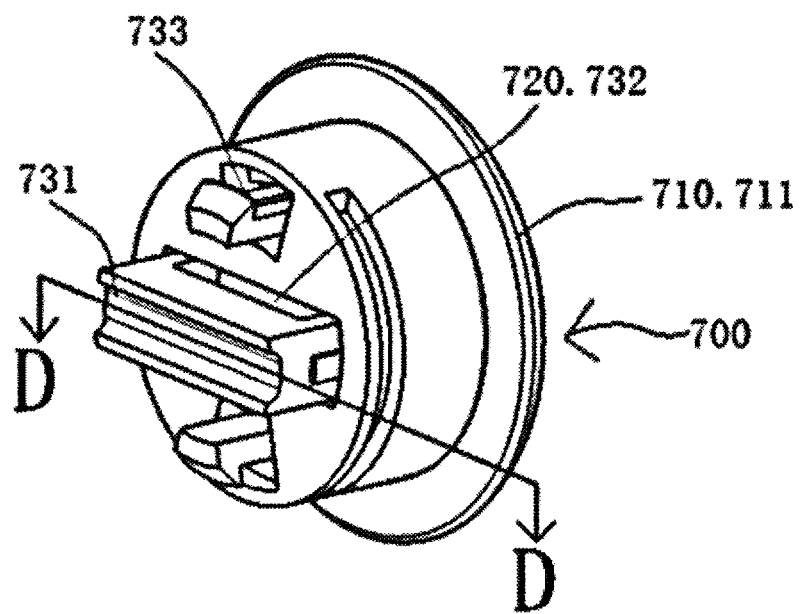
FIG. 19 is a schematic view of the assembly of the unlocking button and being in the unlocked state of the novel four-direction headrest of the invention.
Figure 20:
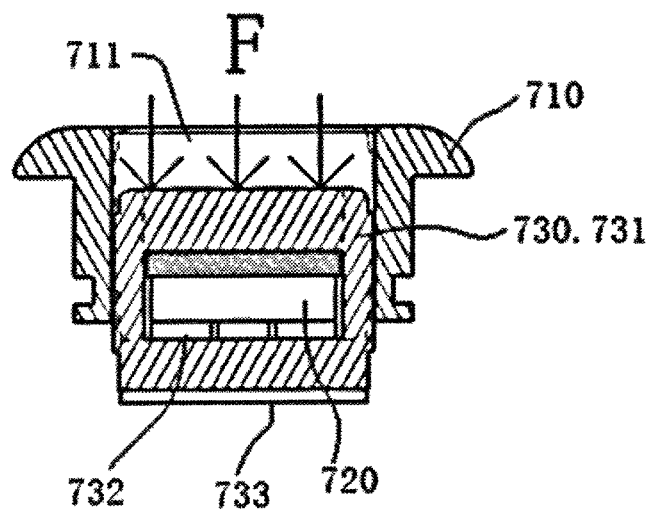
FIG. 20 is a cross-sectional view taken along the line D-D of FIG. 19.
Figure 21:
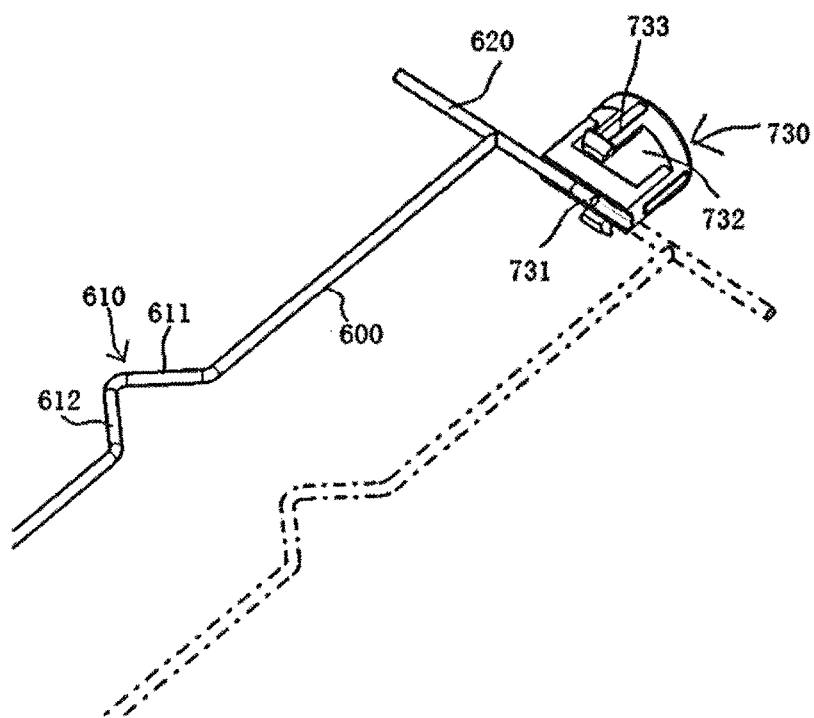
FIG. 21 is a schematic view of the action between the unlocking button and the unlocking steel wire of the novel four-direction headrest of the invention.
Figure 33:
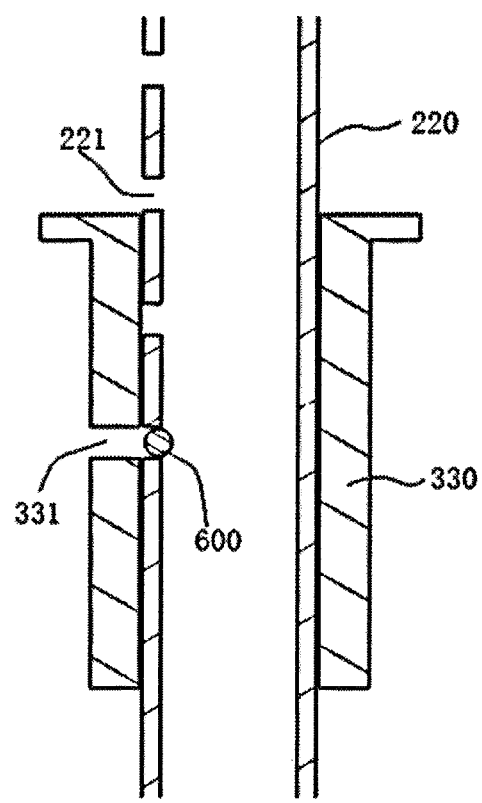
FIG. 33 is a schematic view of the assembly of the vertical supporting bar of the U-shaped headrest bar, the Z-direction sliding sleeve and the unlocking steel wire when the novel four-direction headrest of the invention is in the locked state.
Figure 34:
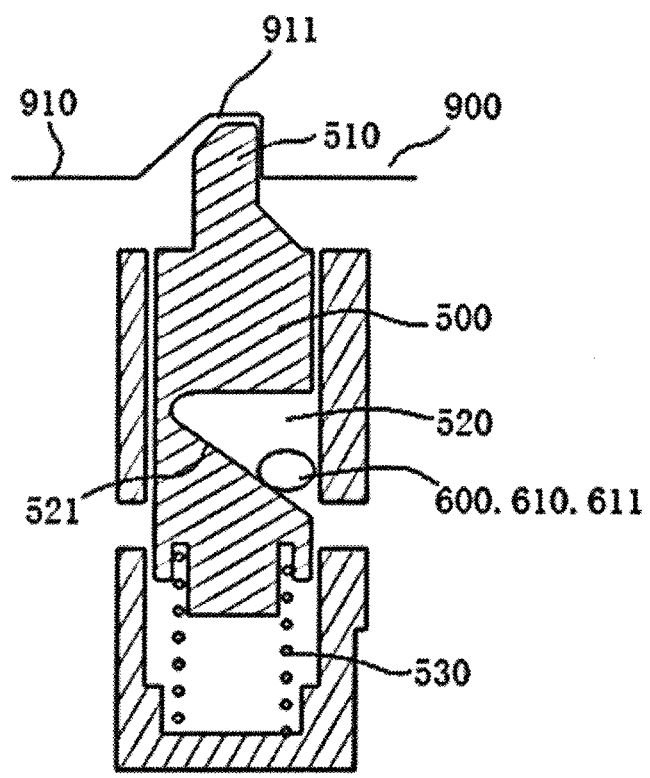
FIG. 34 is a schematic view of a state of the tab, the ratchet teeth on the bottom surface of the X-direction slide guide and the hypotenuse of the triangle in the unlocked steel wire when the novel four-direction headrest of the invention is in the locked state.
Figure 35:
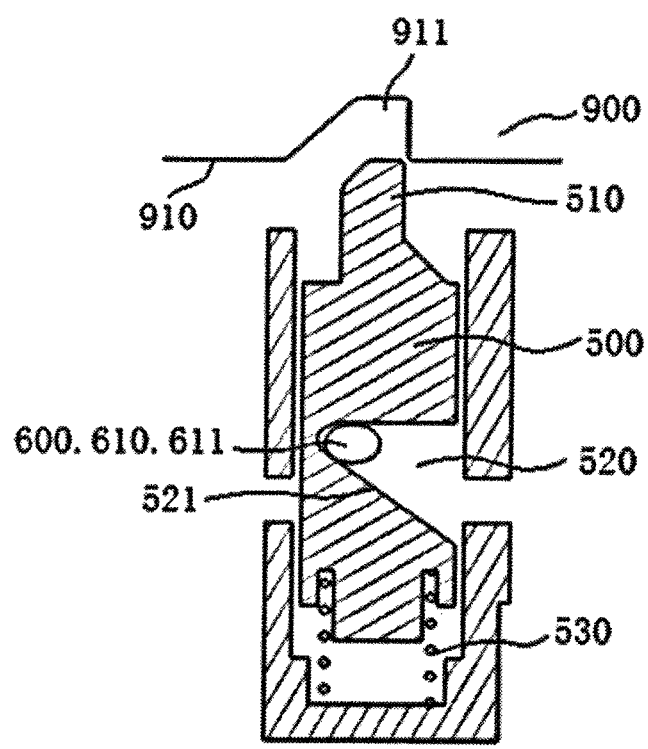
FIG. 35 is a schematic view of a state of the tab, the ratchet teeth on the bottom surface of the X-direction slide guide and the hypotenuse of the triangle in the unlocked steel wire when the novel four-direction headrest of the invention is in the unlocked state.

After unlocking and as shown in FIG. 7, the four-way headrest can move on the Z-direction (not shown), that is, the height position of the four-way headrest can be adjusted, and the headrest housing (not shown) of the four-way headrest drives the Z-direction sliding fixing socket 300, the unlocking mechanism bracket 800, the tab 500 and the two Z-direction sliding sleeves 330 together to move upward and downward on the Z-direction along the two vertical supporting bars 220 of the U-shaped headrest bar 200 by use of the X-direction sliding guide 900 and the X-direction sliding fixing socket 400 fixedly connected thereto, such as move upward to the dotted line position in FIG. 7, in which case the headrest is raised. When the headrest is raised to a designated position, the unlocking button (not shown) is released. Referring to FIGS. 12, 13 and 34, the unlocking steel wire 600 is moved towards the outside of the unlocking steel wire inserting groove 810 of the unlocking mechanism bracket 800 under the action of the two unlocking steel wire return springs 630. Because the hypotenuses 611, 612 of the triangle 610 in the middle of the unlocking steel wire 600 are limited by the two limiting guide bosses 840, 850 in the unlocking steel wire inserting groove 810 so as not to slide out of the unlocking steel wire inserting groove 810 entirely, thus the unlocking steel wire 600 exits the straight groove 331 of the Z-direction sliding sleeve 330 again and slides into the locking notch groove 221 of the vertical supporting bar 220 of the U-shaped headrest bar 200 (See FIG. 33) to lock the unlocking mechanism bracket 800 and the U-shaped headrest bar 200. At the mean time, since the hypotenuse 611 of the triangle 610 on the unlocking steel wire 600 is moved from higher level to lower level along the inclined wedge surface 521 of the unlocking notch groove 520 in the tab 500, the tab 500 is moved upward under the action of the tab return spring 530 after losing the limitation of the hypotenuse 611 of the triangle 610 on the unlocking steel wire 600, and the tab tip 510 of the tab 500 engages with the ratchet teeth 911 of the bottom surface 910 of the X-direction sliding guide 900 again so that the locking between the X-direction sliding guide 900 and the Z-direction sliding fixing socket 300 is realized.

Figure 8:
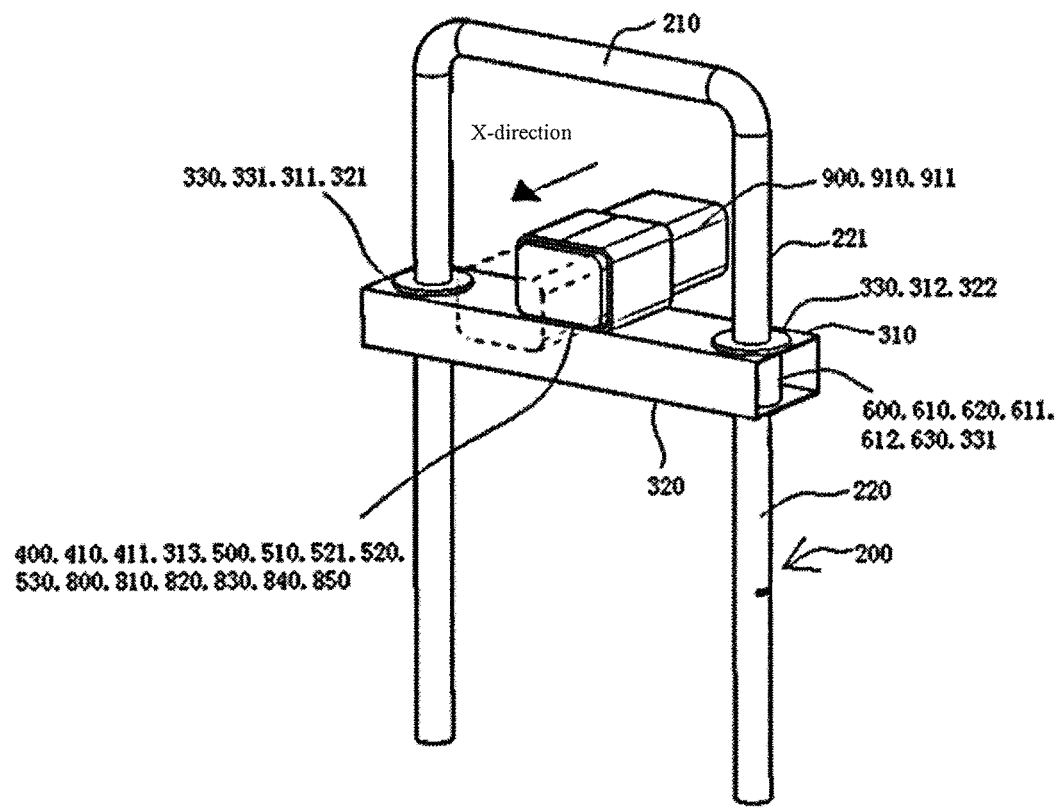
FIG. 8 is a schematic view of the sliding movement of the X-direction sliding guide of the novel four-direction headrest of the invention.

After unlocking and as shown in FIG. 8, the four-way headrest can move on the X-direction (not shown), the headrest housing (not shown) of the four-way headrest drives the X-direction sliding guide 900 fixedly connected thereto to move forward and backward on the axial direction of the X-direction sliding fixing socket 400, for example, the X-direction sliding guide 900 is moved to the dotted line position in FIG. 8 to adjust the front and rear positions of the four-way headrest. When the headrest is moved forward to the designated position, the unlocking button (not shown) is released. Referring to FIGS. 12 and 13, the unlocking steel wire 600 is moved towards the outside of the unlocking steel wire inserting groove 810 of the unlocking mechanism bracket 800 under the action of the two unlocking steel wire return springs 630. Since the hypotenuses 611, 612 of the triangle 610 in the middle of the unlocking steel wire 600 are limited by the two limiting guide bosses 840, 850 in the unlocking steel wire inserting groove 810 so as not to slide out of the unlocking steel wire inserting groove 810 entirely, then the unlocking steel wire 600 slides into the locking notch groove 221 of the vertical supporting bar 220 of the U-shaped headrest bar 200 again, to lock the unlocking mechanism bracket 800 and the U-shaped headrest bar 200. At the mean time, since the hypotenuse 611 of the triangle 610 on the unlocking steel wire 600 is moved from higher position to lower position along the inclined wedge surface 521 of the unlocking notch groove 520 in the tab 500, the tab 500 is moved upward under the action of the tab return spring 530 after losing the limitation of the hypotenuse 611 of the triangle 610 on the unlocking steel wire 600, and the tab tip 510 of the tab 500 engages with the ratchet teeth 911 of the bottom surface 910 of the X-direction sliding guide 900 again so that the locking between the is X-direction sliding guide 900 and the Z-direction sliding fixing socket 300 is realized.

Referring to FIGS. 16 to 21, when unlocking, a force F is applied to the outer end of the unlocking button member 730 by the finger, and the unlocking button member 730 is moved towards the hole bottom of the inner hole 711 along the inner hole 711 of the unlocking button cover 710 after overcoming the resilience of the button return member 720; the inner end 731 of the unlocking button member 730 penetrates the hole bottom of the inner hole 711 of the unlocking button cover 711 and acts on a cross bar portion 620 of the unlocking steel wire 600 to push the unlocking steel wire 600 to achieve the above described unlocking action. When locking, the finger leaves the outer end of the unlocking button member 730, after the unlocking button member 730 lost the limitation, the unlocking button member 730 is moved away from the hole bottom of the inner hole 711 along the inner hole 711 of the unlocking button cover 710 under the action of the button return member 720, so that the inner end 731 of the unlocking button member 730 gradually retracts into the inner hole 711 of the unlocking button cover 710 and loses its effect or action on the crossbar portion 620 of the unlocking steel wire 600. The unlocking steel wire 600 effects the above described locking action under the action of the two unlocking steel wire return spring 630.

Figure 22:
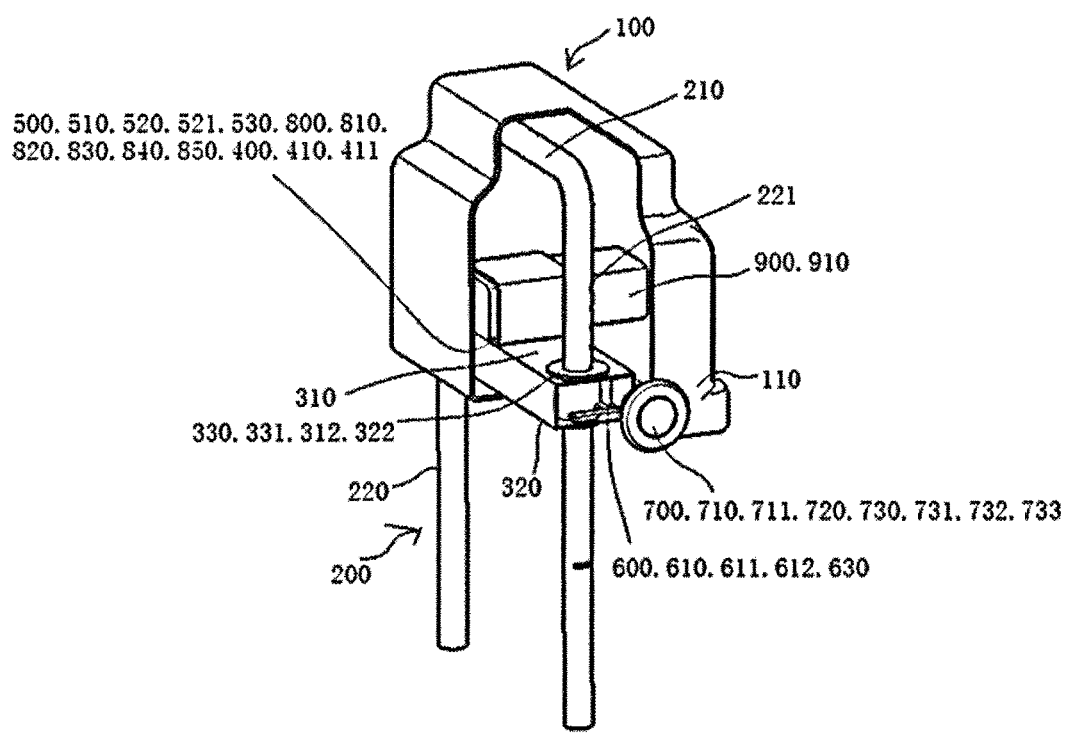
FIG. 22 is a schematic view of a state in which the headrest housing is in the initial position of the novel four-direction headrest of the invention.
Figure 23:
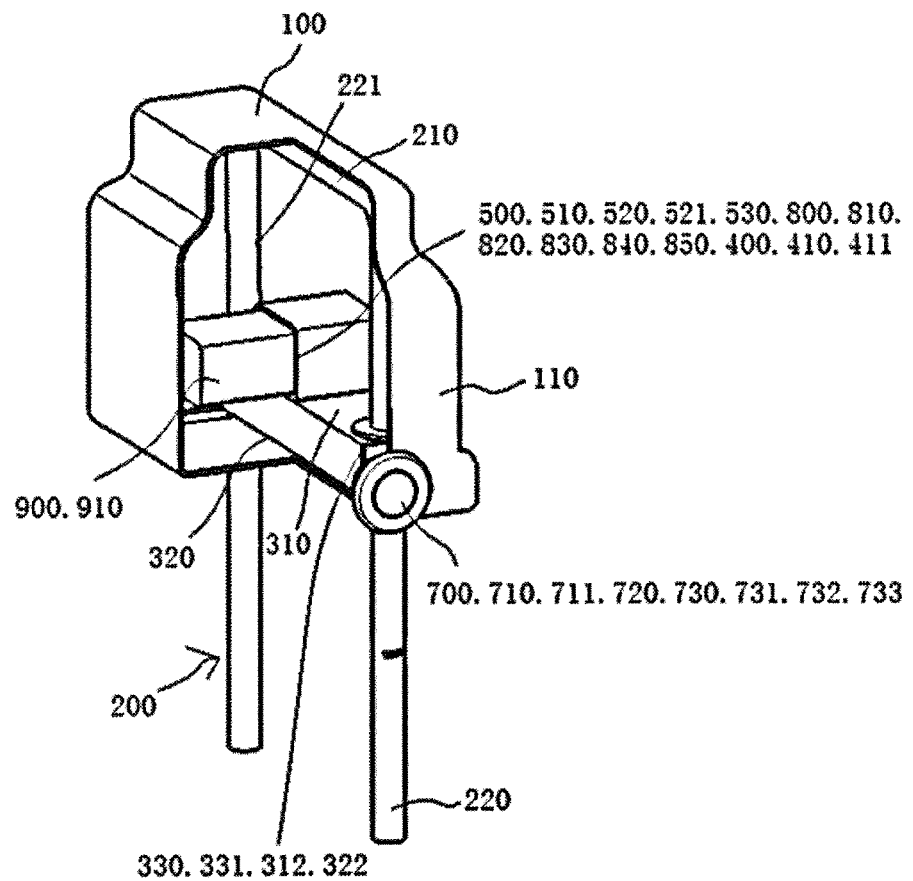
FIG. 23 is a schematic view of a state in which the headrest housing is in the foremost position of the novel four-direction headrest of the invention.
Figure 29:
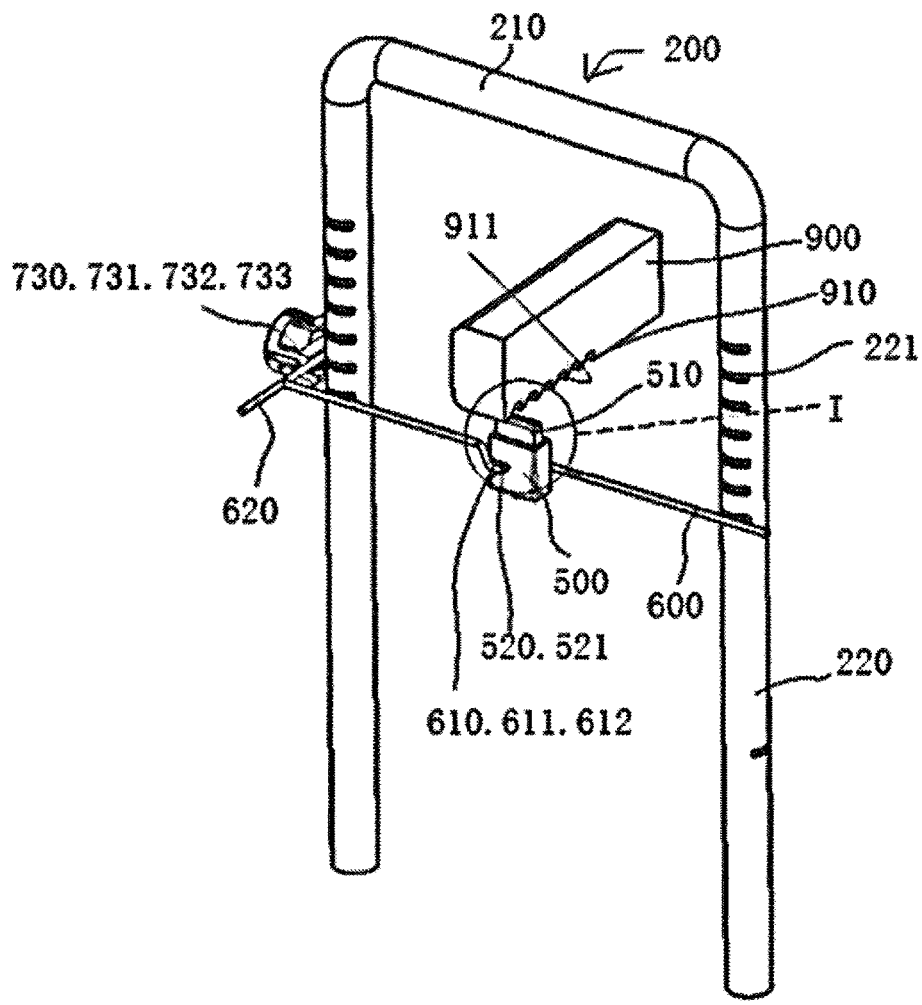
FIG. 29 is a schematic view of a state of the X-direction sliding guide, the tab, the unlocking steel wire, the U-shaped headrest bar and the unlocking button when the headrest housing is in the backmost position of the novel four-direction headrest of the invention.
Figure 30:
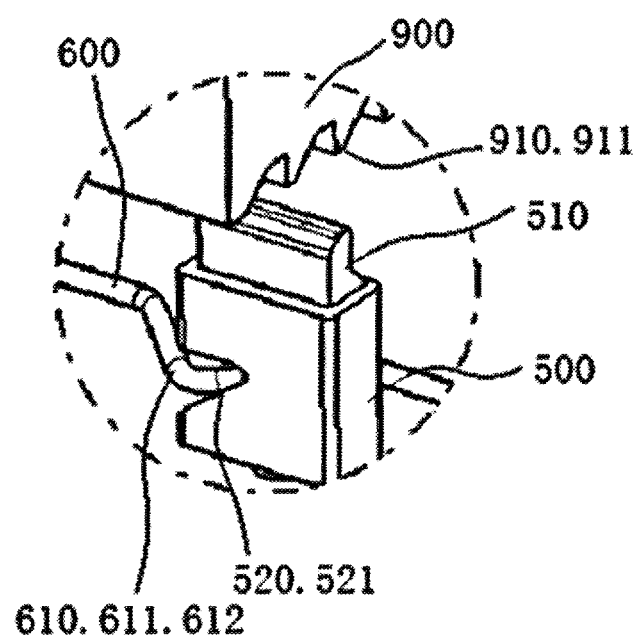
FIG. 30 is an enlarged schematic view of I in FIG. 29.

Referring to FIGS. 22, 29 and 30, when the four-way headrest is in the lowermost and backmost position, the unlocking steel wire 600 falls into the lowermost one of the locking notch grooves 221 on the two vertical supporting bars 220 in the U-shaped headrest bar 200. The tab tip 510 of the tab 500 engages with the frontmost one of the ratchet teeth 911 of the bottom surface 910 of the X-direction sliding guide 900.

Referring to FIGS. 23, 25 to 28, when the four-way headrest is in the lowermost and frontmost position, the unlocking steel wire 600 falls into the lowermost one of the locking notch grooves 221 on the two vertical supporting bars 220 in the U-shaped headrest bar 200. The tab tip 510 of the tab 500 engages with the backmost one of the ratchet teeth 911 of the bottom surface 910 of the X-direction sliding guide 900.

Figure 24:
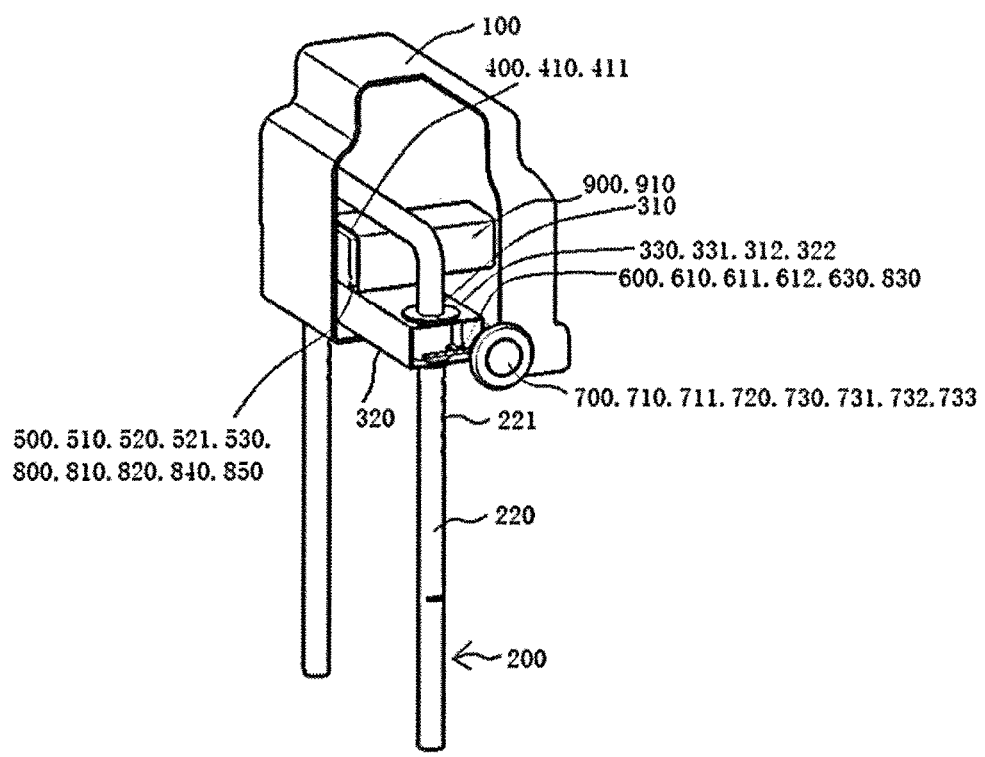
FIG. 24 is a schematic view of a state in which the headrest housing is in the uppermost position of the novel four-direction headrest of the invention.
Figure 25:
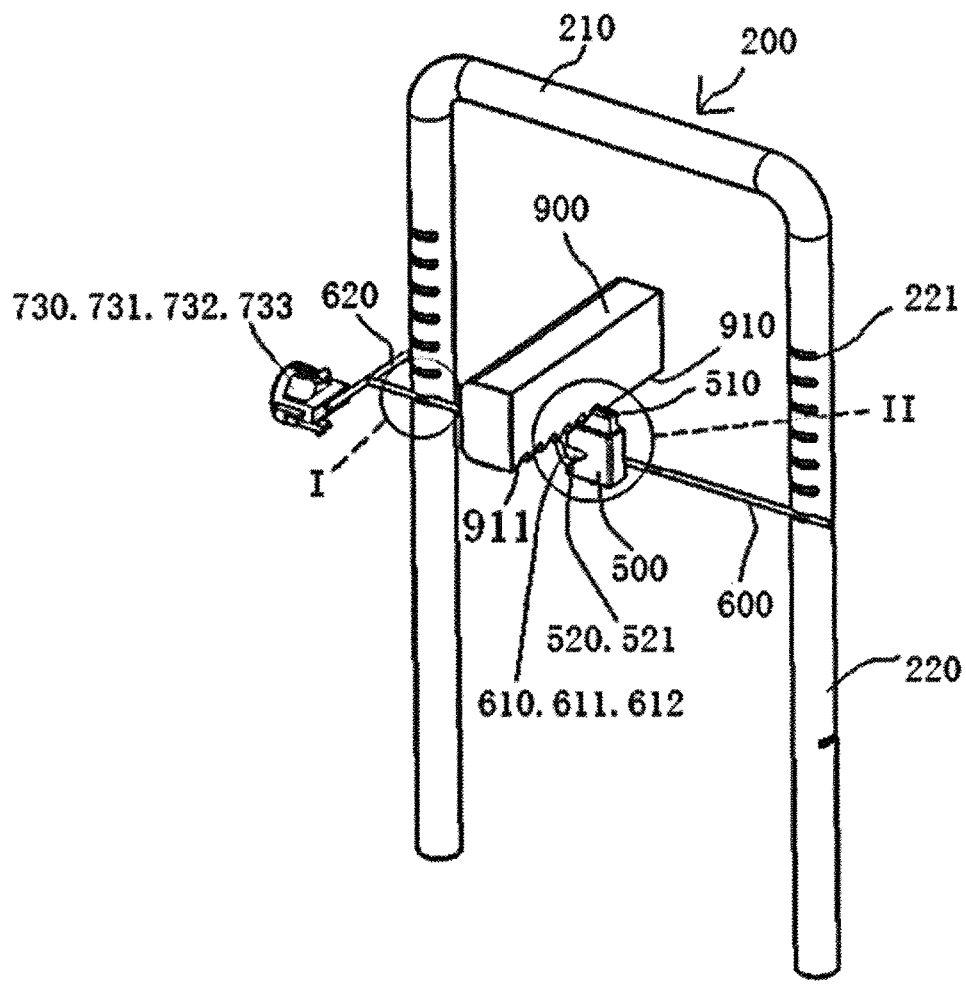
FIG. 25 is a schematic view of a state of the X-direction sliding guide, the tab, the unlocking steel wire, the U-shaped headrest bar and the unlocking button when the headrest housing is in the initial position of the novel four-direction headrest of the invention.
Figure 26:
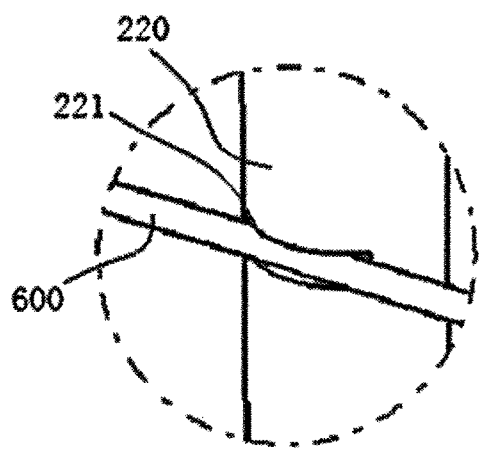
FIG. 26 is an enlarged schematic view of I in FIG. 25.
Figure 27:
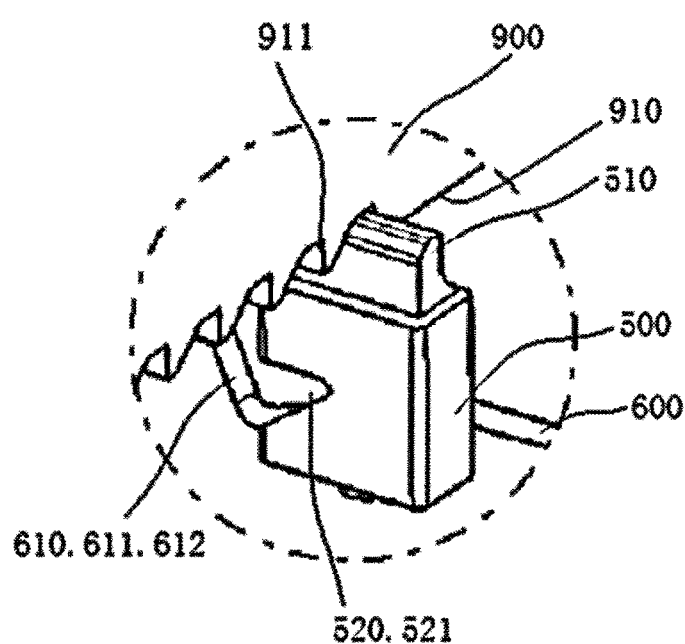
FIG. 27 is an enlarged schematic view of II in FIG. 25.

Referring to FIG. 24, when the four-way headrest is in the uppermost and backmost position, the unlocking steel wire 600 falls into the uppermost one of the locking notch grooves 221 on the two vertical supporting bars 220 in the U-shaped headrest bar 200. The tab tip 510 of the tab 500 engages with the frontmost one of the ratchet teeth 911 of the bottom surface 910 of the X-direction sliding guide 900.

Figure 31:
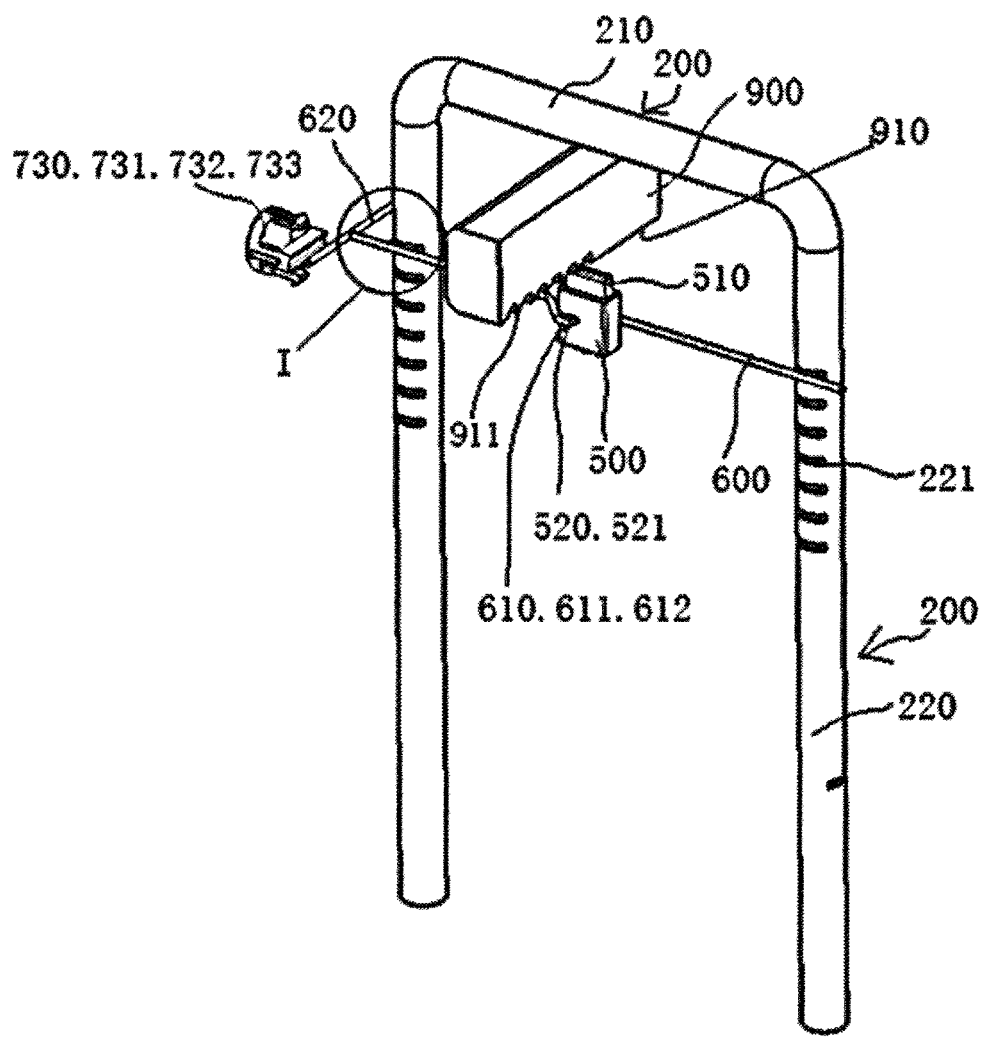
FIG. 31 is a schematic view of a state of the X-direction sliding guide, the tab, the unlocking steel wire, the U-shaped headrest bar and the unlocking button when the headrest housing is in the uppermost position of the novel four-direction headrest of the invention.
Figure 32:
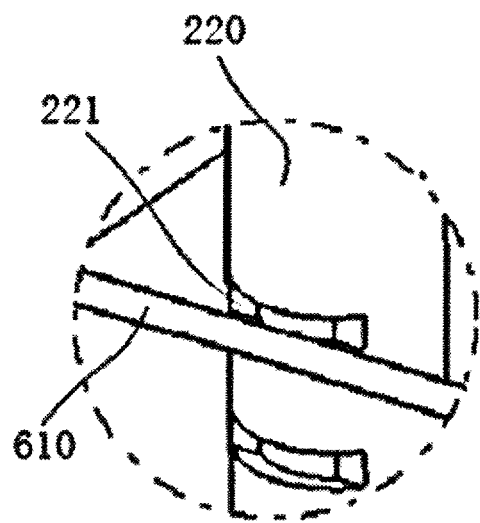
FIG. 32 is an enlarged schematic view of I in FIG. 31.

Referring to FIGS. 31 and 32, when the four-way headrest is in the uppermost and frontmost position, the unlocking steel wire 600 falls into the uppermost one of the locking notch grooves 221 on the two vertical supporting bars 220 in the U-shaped headrest bar 200. The tab tip 510 of the tab 500 engages with the backmost one of the ratchet teeth 911 of the bottom surface 910 of the X-direction sliding guide 900.

Figure 28:
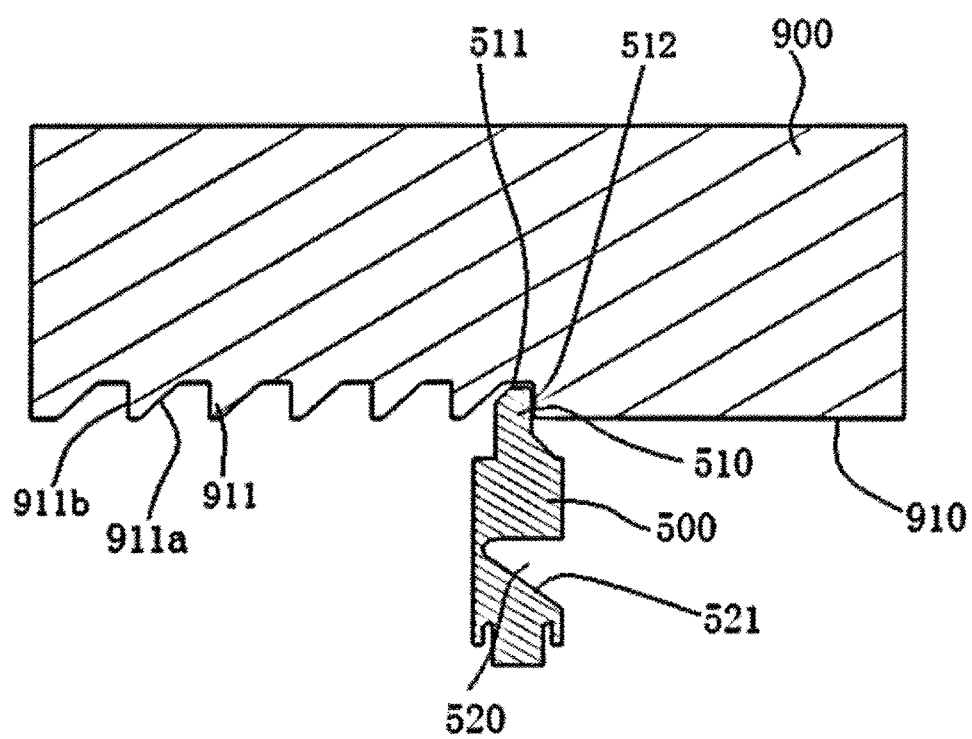
FIG. 28 is a schematic view of the engagement between the X-direction sliding guide and the tab when the headrest housing is in the initial position of the novel four-direction headrest of the invention.

Additionally, Referring to FIG. 28, the rear tooth surface 911a of the ratchet teeth 911 of the bottom surface 910 of the X-direction sliding guide 900 is a helical tooth surface, and the front tooth surface 911b is a flat surface. The front tab surface 511 of the tab tip 510 is a bevel surface, and the rear tab surface 512 is a flat surface, so that the X-direction sliding guide 900 can not move forward because the rear tab surface 512 of the tab tip 510 and the front tooth surface 911b of the ratchet teeth 911 are in contact with each other in the locking state, but when subjected to a backward thrust, the X-direction sliding guide 900 can move backward. Therefore, when the four-way headrest is subjected to an impact, since the rear tooth face 911a of the ratchet teeth 911 is an helical tooth surface and the front tab surface 511 of the tab tip 510 is a bevel surface, the X-direction sliding guide 900 can move backward, so that the headrest housing (not shown) can retract to absorb the impact force to protect the head and neck of the occupant save.

The invention claimed is:

1. A novel four-direction headrest comprising:
   a headrest housing having a button hole disposed at a lower part of one side wall of the headrest housing;
   a U-shaped headrest bar having an upper portion at a crossbar end of the U-shaped headrest bar, the upper portion of the U-shaped headrest bar being inserted into the headrest housing from a bottom of the headrest housing, the U-shaped headrest bar provided with a plurality of locking notch grooves spaced apart on two vertical supporting bars, axes of the locking notch grooves being parallel to the crossbar of the U-shaped headrest;
   a sliding sleeve disposed at a Z-direction sliding fixing socket on the two vertical supporting bars of the U-shaped headrest bar, an inner part of the Z-direction sliding fixing socket being hollow and its axis being parallel to the crossbar of the U-shaped headrest and perpendicular to a forward and backward movement direction of the headrest and comprising at least a first wall parallel to the crossbar of the U-shaped headrest bar, a tab projecting hole formed in the first wall;
   an unlocking mechanism bracket installed in the hollow inner part of the Z-direction sliding fixing socket, the unlocking mechanism bracket provided with an unlocking steel wire inserting groove and a tab inserting blind hole, wherein the unlocking steel wire inserting groove and the tab inserting blind hole are interpenetrating, respective axes of the unlocking steel wire inserting groove and the tab inserting blind hole are perpendicular to each other, the axis of the unlocking steel wire inserting groove and the axis of the tab inserting blind hole are perpendicular to the forward and backward movement direction of the headrest, and the axis of the unlocking steel wire inserting groove is parallel to the crossbar of the U-shaped headrest bar, the axis of the tab inserting blind hole is parallel to the vertical support bars of the U-shaped headrest bar and an opening thereof butts and connects to the tab projecting hole of the Z-direction sliding fixing socket;

a tab and a tab return spring slidably disposed in the tab inserting blind hole of the unlocking mechanism bracket, the tab comprising a tab tip projecting from the opening of the tab inserting blind hole and through the tab projecting hole of the Z-direction sliding fixing socket, and the tab being provided with an unlocking notch groove, the unlocking notch groove corresponding to the unlocking steel wire inserting groove on the unlocking mechanism bracket, a groove bottom of the unlocking notch groove being an inclined wedge surface, one end of the tab return spring contacting the tab and the other end contacting a bottom surface of the tab inserting blind hole;

an X-direction sliding fixing socket fixed on the first wall of the Z-direction sliding fixing socket, an inner part of the X-direction sliding fixing socket being hollow, an axis of the X-direction sliding fixing socket and the axis of the Z-direction sliding fixing socket being perpendicular to each other and the axis of the X-direction sliding fixing socket being parallel to the frontward and backward movement direction of the headrest, the X-direction sliding fixing socket being open on both ends parallel to the frontward and backward movement direction of the headrest and having a second wall connected to the first wall of the Z-direction sliding fixing socket, the second wall being parallel to the axis of the X-direction sliding fixing socket, and a tab inserting hole being formed in the second wall, the tab inserting hole butting and connecting to the tab projecting hole of the Z-direction sliding fixing socket, and the tab tip being inserted through the tab projecting hole of the Z-direction sliding fixing socket into the hollow inner part of the Z-direction sliding fixing socket;

an X-direction sliding guide slidably inserted into the hollow inner part of the X-direction sliding fixing socket, both ends of the X-direction sliding guide being parallel to the forward and backward movement direction of the headrest and respectively projecting through the openings on both ends of the X-direction sliding fixing socket parallel to the forward and backward movement direction of the headrest, wherein one end of the X-direction sliding guide parallel to the forward and backward movement direction of the headrest is securely connected with the headrest housing and comprises at least a first surface parallel to the second wall of the X-direction sliding fixing socket and a plurality of ratchet teeth disposed on the first surface which are engaged with the tab tip of the tab;

an unlocking steel wire slidably disposed in the unlocking steel wire inserting groove of the unlocking mechanism bracket, an intermediate position of the unlocking steel wire having a curved portion which is capable of acting on an inclined wedge surface in the tab, both ends of the unlocking steel wire being slidable in and out through the locking notch grooves of the two vertical support bars of the U-shaped headrest bar, respectively; and an unlocking button installed in the button hole on the headrest housing, the unlocking button acting on one end of the unlocking steel wire.

2. The novel four-direction headrest of claim 1, wherein the Z-direction sliding fixing socket is made of a rectangular tube that is open on both ends, and a top surface of the rectangular tube forms the first wall of the Z-direction sliding fixing socket, an upper U-shaped headrest bar through hole is respectively formed at each end of the top surface of the rectangular tube, and a lower U-shaped headrest bar through hole is respectively formed at each end of a bottom surface of the rectangular tube, the upper and lower U-shaped headrest bar through holes disposed at the same end of the rectangular tube are coaxial and are inserted therein with a Z-direction sliding sleeve, and a straight groove is formed in a sleeve wall of each Z-direction sliding sleeve so as to allow the unlocking steel wire to pass through and to be embedded into the locking notch groove in the two vertical supporting bars of the U-shaped headrest bar, the two vertical supporting bars of the U-shaped headrest bar are respectively passed through two Z-direction sliding sleeves.

3. The novel four-direction headrest of claim 1, wherein the headrest housing is a plastic part and is prepared by a blow molding method or a hot-melt method.

4. The novel four-direction headrest of claim 1, wherein the Z-direction sliding fixing socket is integrally formed with the X-direction sliding fixing socket.

5. The novel four-direction headrest of claim 1, wherein the crossbar and the two vertical supporting bars of the U-shaped headrest bar are separately manufactured, and both ends of the crossbar are connected to upper ends of the two supporting bars by riveting.

6. The novel four-direction headrest of claim 1, wherein an unlocking steel wire return spring inserting hole is provided at each end of a groove bottom of the unlocking steel wire inserting groove of the unlocking mechanism bracket, and an unlocking steel wire return spring is disposed in each unlocking steel wire return spring inserting hole, and an outer end of the unlocking steel wire return spring acts on the unlocking steel wire.

7. The novel four-direction headrest of claim 6, wherein at least one limiting guide boss is disposed on an inner groove wall of the unlocking steel wire inserting groove of the unlocking mechanism bracket, and the limiting guide boss limits and guides the curved portion of the unlocking steel wire.

8. The novel four-direction headrest of claim 7, wherein the curved portion has a triangular configuration with a first hypotenuse and a second hypotenuse, wherein the first hypotenuse acts on the inclined wedge surface of the unlocking notch groove of the tab, and two limiting guide bosses are located on the outsides of the first hypotenuse and the second hypotenuse, respectively.

9. The novel four-direction headrest of claim 1, wherein a cross bar portion perpendicular to the axis of the unlocking steel wire is disposed at one end of the unlocking steel wire, and the cross bar portion and the unlocking button interact with each other.

10. The novel four-direction headrest of claim 9, wherein the unlocking button includes an unlocking button cover, a button return member and an unlocking button member, the unlocking button cover has an inner hole, the button return member and the unlocking button member are assembled in the inner hole, and an inner end of the unlocking button member penetrates an inner hole bottom of the unlocking button cover and acts on the cross bar portion of the unlocking steel wire, and the button return member is disposed in the inner hole of the unlocking button member, one end thereof is in contact with the inner hole top of the unlocking button member and the other end is in contact with the inner hole bottom of the unlocking button cover.

11. The novel four-direction headrest of claim 1, wherein the Z-direction sliding fixing socket and the X-direction sliding fixing socket are made of a high-strength metal material.

12. The novel four-direction headrest of claim 1, wherein a rear tooth surface of the ratchet teeth on the first surface of the X-direction sliding guide is a helical tooth surface and a front tooth surface is a flat surface, a front tab surface of the tab tip is an inclined surface and a rear tab surface is a flat surface, and in a locked state, the front tooth surface of the ratchet teeth comes into contact with the rear tab surface of the tab tip and prevents the X-direction sliding guide from moving forward, and the X-direction sliding guide is capable of moving backward after the X-direction sliding guide is subjected to a backward force transmitted from the headrest housing.

\* \* \* \* \*